US00RE44749E

(19) United States
(12) Reissued Patent
Adair et al.

(10) Patent Number: US RE44,749 E
(45) Date of Reissued Patent: Feb. 4, 2014

(54) CENOTAPH FACILITY AND METHOD INCLUDING AUCTIONING OF ITEMS ASSOCIATED WITH HONOREE

(75) Inventors: Cameron Adair, Atlanta, GA (US); Thomas T. Prousalis, Alexandria, VA (US)

(73) Assignee: Legend Memorial Cenotaphs, Inc. GA (US)

(21) Appl. No.: 13/474,441

(22) Filed: May 17, 2012

Related U.S. Patent Documents

Reissue of:
(64) Patent No.: 8,156,011
Issued: Apr. 10, 2012
Appl. No.: 12/647,341
Filed: Dec. 24, 2009

U.S. Applications:
(60) Provisional application No. 61/266,650, filed on Dec. 4, 2009, provisional application No. 61/242,443, filed on Sep. 15, 2009, provisional application No. 61/141,076, filed on Dec. 29, 2008.

(51) Int. Cl.
*G06Q 30/00* (2012.01)

(52) U.S. Cl.
USPC ..... 705/26.3; 705/26.1; 705/311; 52/128; 52/134; 52/136; 52/139

(58) Field of Classification Search
USPC ..... 705/1.1, 26.1–27.2
See application file for complete search history.

(56) References Cited

U.S. PATENT DOCUMENTS 6,634,143 B1 10/2003 Yoo
7,024,735 B1 * 4/2006 Huggins ..... 27/1

(Continued)

FOREIGN PATENT DOCUMENTS

EP 1677566 A1 7/2006
KR 1020020028197 A 4/2002
WO 0143049 A1 6/2001

OTHER PUBLICATIONS

Monuments: landmarks and reflections of the past: most monuments are constructed projects and use technologies worth studying from their designed and constructed perspectives.(Resources in Technology) Frazier, Maurice T.; Ritz, John M. Technology Teacher, 68, 1, 12(6) Sep. 2008.*
Education helps us appreciate war vets Alan cochrane City Views. The Times—Transcript. Moncton, N.B.; Nov. 14, 2008. p. D.7.*

(Continued)

*Primary Examiner* — William Allen
(74) *Attorney, Agent, or Firm* — Michael J. Donohue; Davis Wright Tremaine LLP

(57) ABSTRACT

A cenotaph memorial facility comprising a plurality of walls containing crypts is dedicated to an honoree who is not interred within the facility. The facility may comprise a large external memorial structure to protect the walls and individual crypts. The cenotaph memorial facility includes a plurality of video cameras to permit remote viewing of various portions of the facility. The video cameras are controlled by a computer system that allows remote access via a network, such as the internet. An individual enters authorization data and, upon authorization, can remotely view one or more portions of the facility. An on-line auction processor can automatically conduct auctions of selected articles using a timed auction over a prolonged bidding period or a real-time auction. In another aspect, a virtual reality (VR) image capture system captures images that may be remotely viewed using VR technology. This may include 3-D imaging, holographic imaging, or the like. Image viewing may be remotely controlled using conventional controls or VR controls.

43 Claims, 23 Drawing Sheets

(56) References Cited

U.S. PATENT DOCUMENTS

| | | | | |
|---|---|---|---|---|
| 7,937,814 | B2 * | 5/2011 | Voit | 27/1 |
| 8,156,011 | B2 * | 4/2012 | Adair et al. | 705/26.3 |
| 2004/0211129 | A1 * | 10/2004 | Sannipoli et al. | 52/133 |
| 2007/0260610 | A1 * | 11/2007 | Mindrum | 707/10 |
| 2008/0281831 | A1 * | 11/2008 | Mindrum | 707/10 |
| 2008/0282163 | A1 * | 11/2008 | Mindrum | 715/716 |

OTHER PUBLICATIONS

Remembering heroes; The Sherbrooke Cenotaph; Caption Only [Photo: Courtesy/ Above, the Sherbrooke memorial was . . . ]; [Final Edition] Record. Sherbrooke, Que.: Feb. 11, 2008. p. 2.*
www.oackbayvillage.ca/history/cenotaph.html. Nov. 17, 2011.*
PCT/US2009/069614 International Search Report.

* cited by examiner

CENOTAPH FACILITY AND METHOD INCLUDING AUCTIONING OF ITEMS ASSOCIATED WITH HONOREE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is directed generally to a memorial facility and, more particularly, to a cenotaph memorial facility and method of operation.

2. Description of the Related Art

Interment rituals extend back to prehistoric times. Archaeologists have discovered remains throughout the world that indicate ritualistic interment of the deceased. The discovered remains have been of individuals, couples (e.g. a husband and wife) and even entire families. The discoveries have indicated that the bodies are often placed in tombs, or other locations, in a careful manner. The bodies are often accompanied by artifacts, such as weapons, tools, jewelry, and the like.

The Egyptians developed complex interment rituals, including mummification. The mummified remains were entombed within a sarcophagus inside a pyramid. Tools, implements, jewelry, and the like were often interred in nearby chambers. Thus, ritualistic interment, in its various forms, has been used over the centuries.

In contrast to interment rituals, a cenotaph is not designed to contain remains. A cenotaph is defined as "a monument erected in the honor of a deceased person whose remains are interred elsewhere." Webster's II New College Dictionary, Houghton Mifflin Co., New York 2001. For example, a cenotaph may have been used to honor a war hero whose remains were not recovered or were interred elsewhere. For example, a seaman may have been laid to rest at sea and a cenotaph created in the seaman's home country.

BRIEF DESCRIPTION OF THE SEVERAL VIEWS OF THE DRAWING(S)

FIG. 15 illustrates an arrangement of crypts and the installation of cameras and lighting to provide for security or on-line/remote viewing.

DETAILED DESCRIPTION OF THE INVENTION

The present disclosure is directed to a cenotaph memorial facility. As will be described in greater detail below, the cenotaph may be dedicated to any individual, such as a religious figure, political figure, military figure, sports or entertainment figure, or the like. The cenotaph may also be dedicated to a group of individuals or organization, such as a military group (e.g., sailors from the U.S.S. Arizona). The individual or group to whom a cenotaph memorial facility is dedicated may be referred to herein as an honoree.

While the honoree is not, in fact, interred within the cenotaph, the cenotaph memorial facility described herein may contain the remains, or other memorial items, of individuals wishing to be interred in association with the honoree. For example, the cenotaph may be dedicated to a particular political figure or a religious figure (i.e., the honoree). Individuals who admired that honoree may wish to be interred within the cenotaph memorial facility dedicated to that honoree. The deceased's remains may by interred within a crypt which, together with the cenotaph, form a cenotaph memorial facility dedicated to the honoree. In some situations, the honoree may, in fact, be interred within the memorial facility. While such an arrangement may not strictly be considered a cenotaph, such a possibility is within the scope of the present disclosure.

Similarly, a cenotaph may be dedicated to a deceased military commander. Individuals that may have served under the command of that deceased military figure may wish to be interred in a cenotaph memorial facility dedicated to their deceased commander. Those skilled in the art will appreciate that other cenotaph memorial facilities may be dedicated to different political figures, military figures, religious figures, sports or entertainment figures, or the like. The present disclosure is not limited to a cenotaph for any particular individual, group of individuals, or organization.

Figure 1:
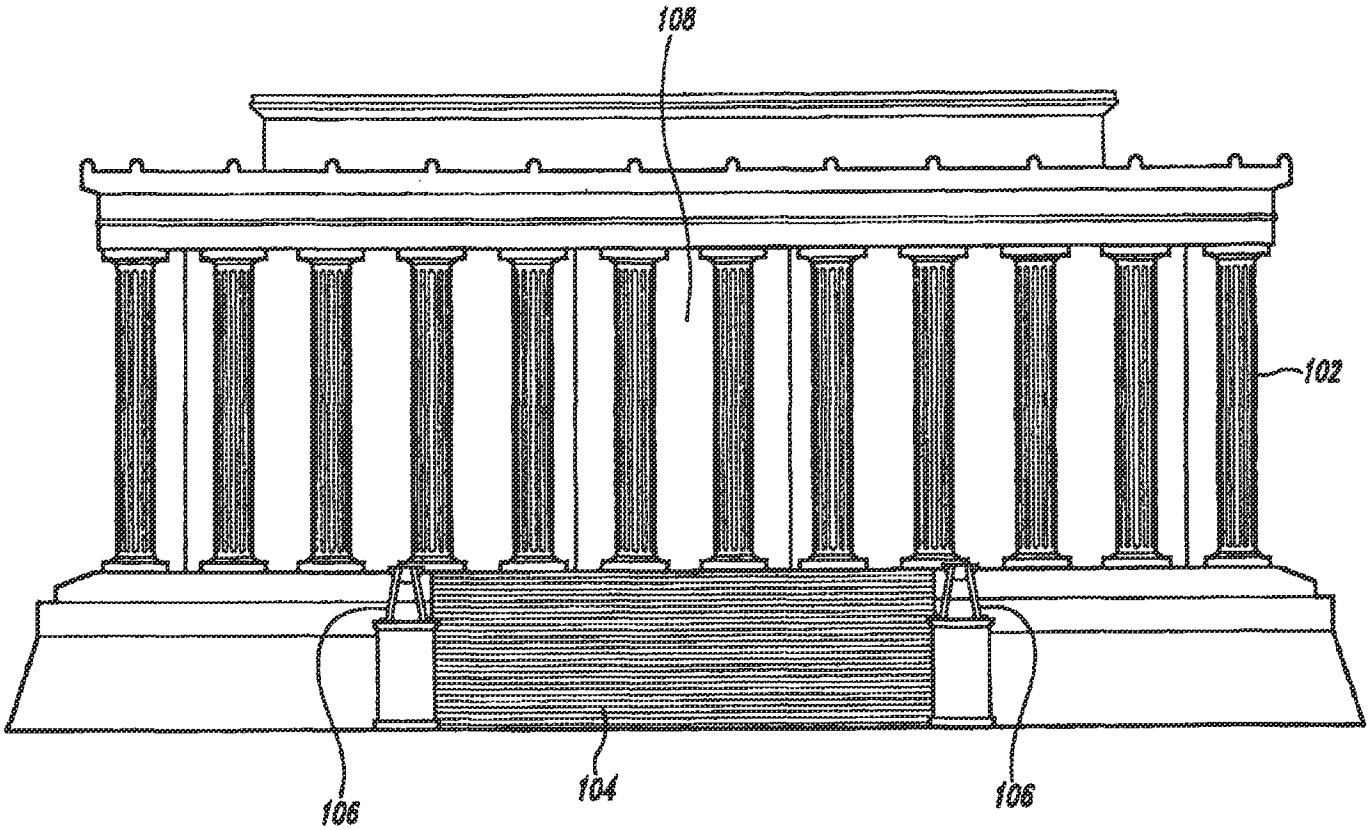
FIG. 1 is a front elevation view of a cenotaph memorial facility.
Figure 2:
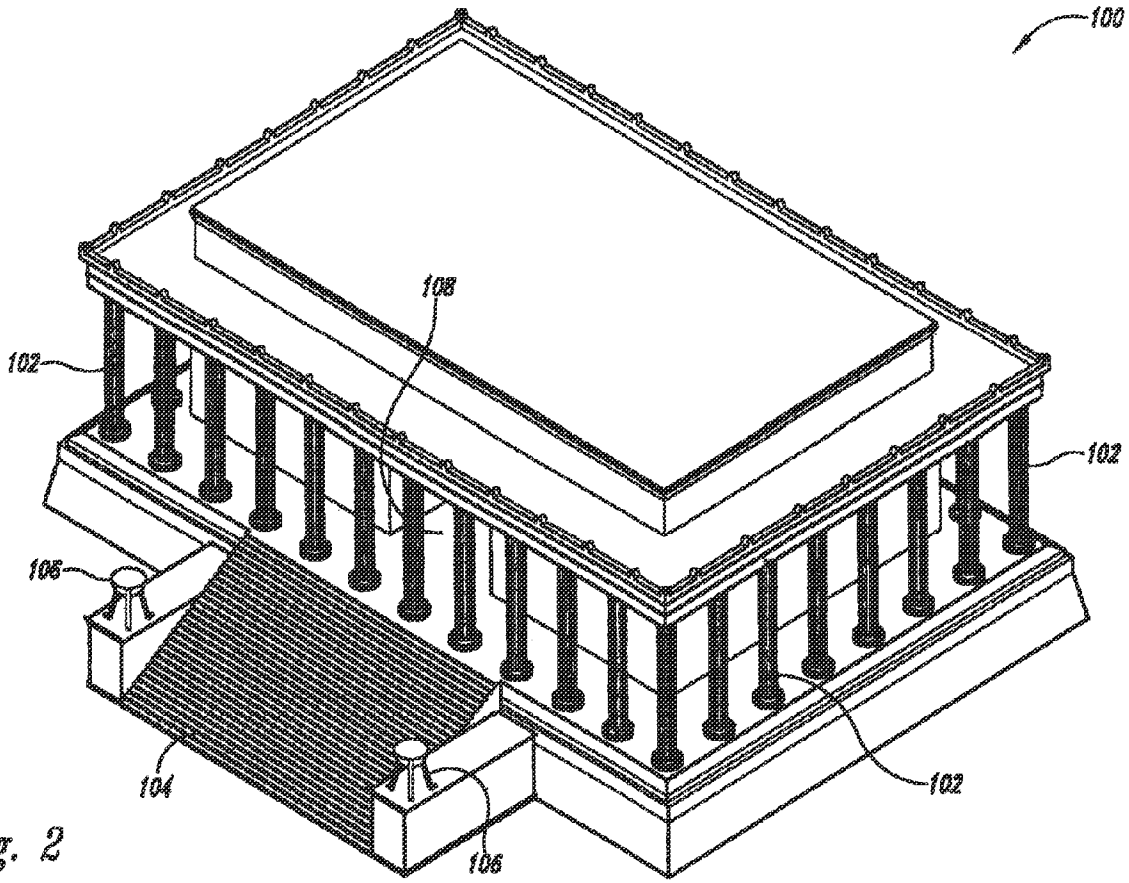
FIG. 2 is a perspective view of the cenotaph memorial facility of FIG. 1.

The cenotaph memorial facility may have an external structure of almost any size and/or shape. FIGS. 1-6 provide some illustrative examples of different shapes that may be used to implement the cenotaph. For example, FIG. 1 illustrates a cenotaph memorial facility 100 constructed in a rectangular configuration, such as the Lincoln Memorial, the Parthenon, or the like. FIG. 2 is a perspective view of the cenotaph memorial facility 100 of FIG. 1. Those skilled in the art will appreciate that the cenotaph memorial facility 100 may be scaled up or down in size to accommodate a desired number of crypts. For example, a cenotaph memorial facility the size of the Lincoln Memorial (204' wide×134' deep×99' height) could be configured to hold up to 100,000 or more crypts within the structure. Different layout configurations for crypts will be described in greater detail below.

The cenotaph memorial facility 100 illustrated in FIG. 1 includes a plurality of columns 102 arranged along a peripheral edge of the structure. The cenotaph memorial facility 100 is also constructed above ground and has one or more sets of stairs 104 leading to an entryway 108. In the example of FIGS. 1-2, the large open entry 108 provides visitor access to the interior portion of the cenotaph memorial facility 100. Additional ornamentation 106 is positioned proximate the stairs 104. The ornamentation 106 may be statues, memorial objects, or other forms of decoration. Those skilled in the art will appreciate that the specific arrangement of structural features, such as the columns 102, stairs 104, ornamentation 106, and entry 108 can vary from one structure to another. Thus, the cenotaph memorial facility 100 illustrated in FIGS. 1-2 is merely illustrative of various shapes and optional features that may be included in the cenotaph memorial facility 100.

Figure 3:
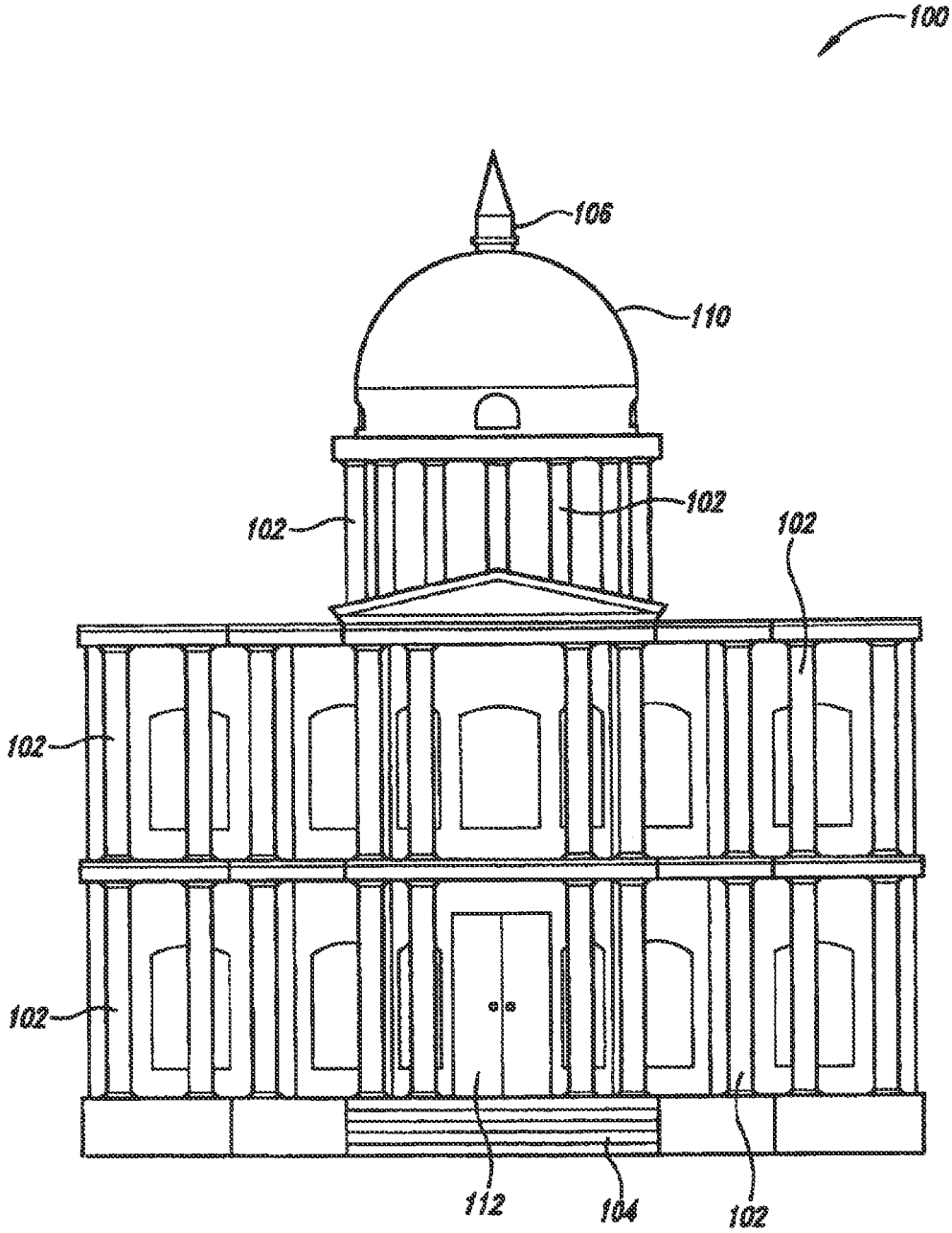
FIG. 3 is a front elevation view of a different configuration of a cenotaph memorial facility.
Figure 4:
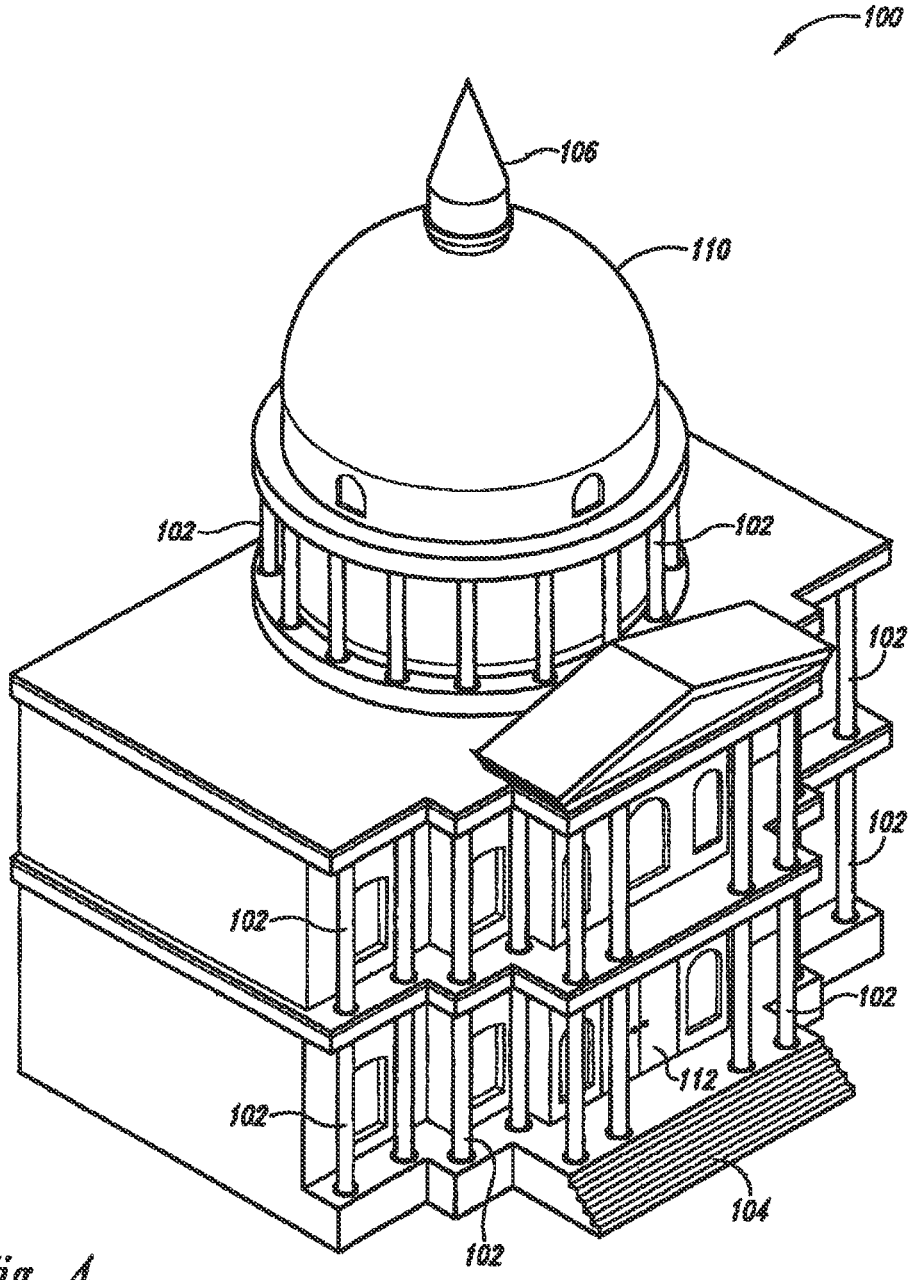
FIG. 4 is a perspective view of the cenotaph memorial facility of FIG. 3.

FIG. 3 illustrates an alternative external configuration for the cenotaph memorial facility 100. In this embodiment, the cenotaph memorial facility 100 is configured with a large dome 110, such as may be common in a cathedral or memorials, such as Napoleon's tomb. Ornamentation 106, such as a statue, may be placed atop the dome 110. In the embodiment of the cenotaph memorial facility 100 illustrated in FIGS. 3-4, the open entry 108 has been replaced by entry doors 112. FIG. 4 is a perspective view of the cenotaph memorial facility 100 of FIG. 3. Again, this configuration may be scaled in size to accommodate a desired number of crypts.

Figure 5:
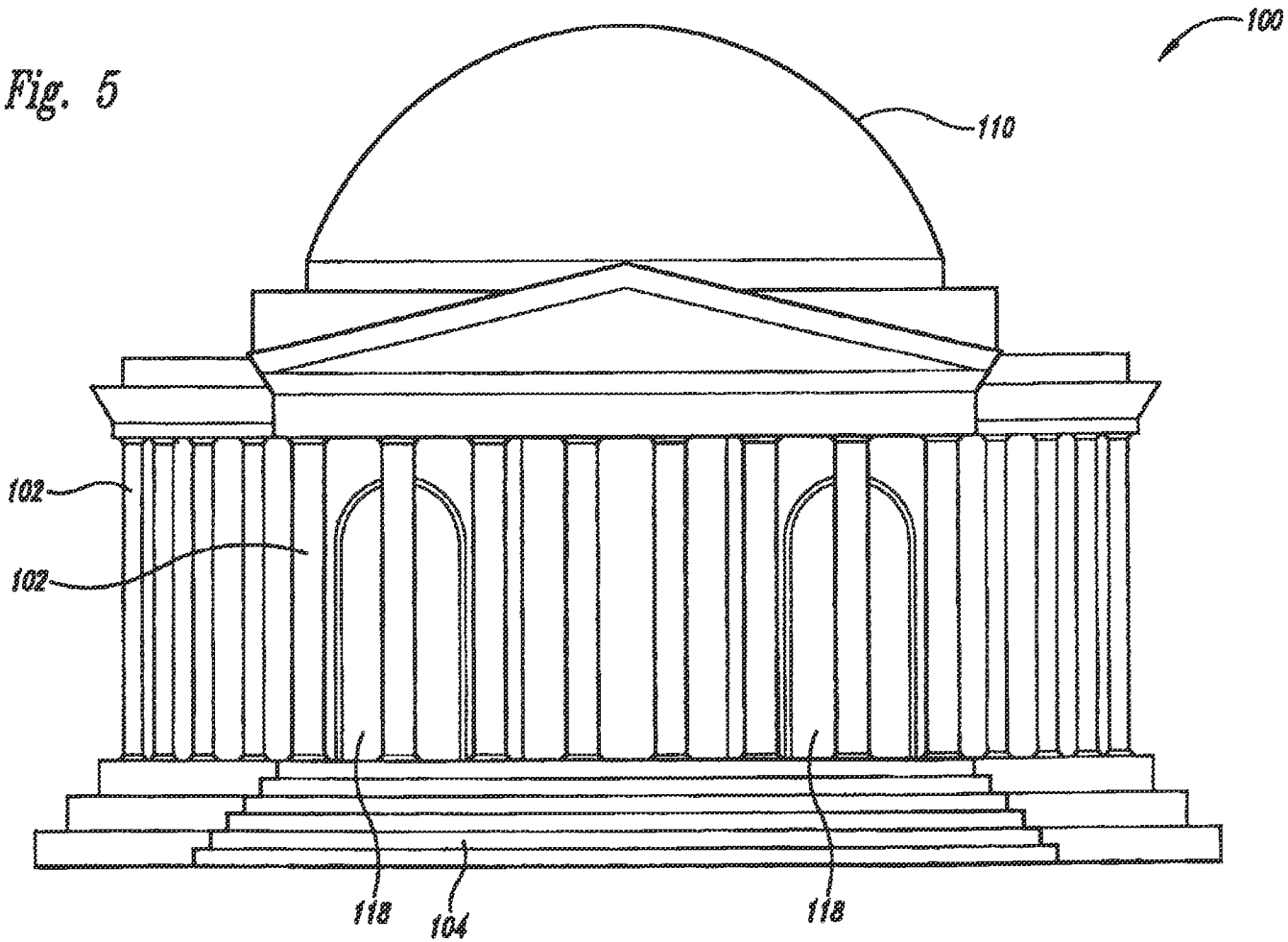
FIG. 5 is a front elevation view of yet another alternative configuration for a cenotaph memorial facility.
Figure 6:
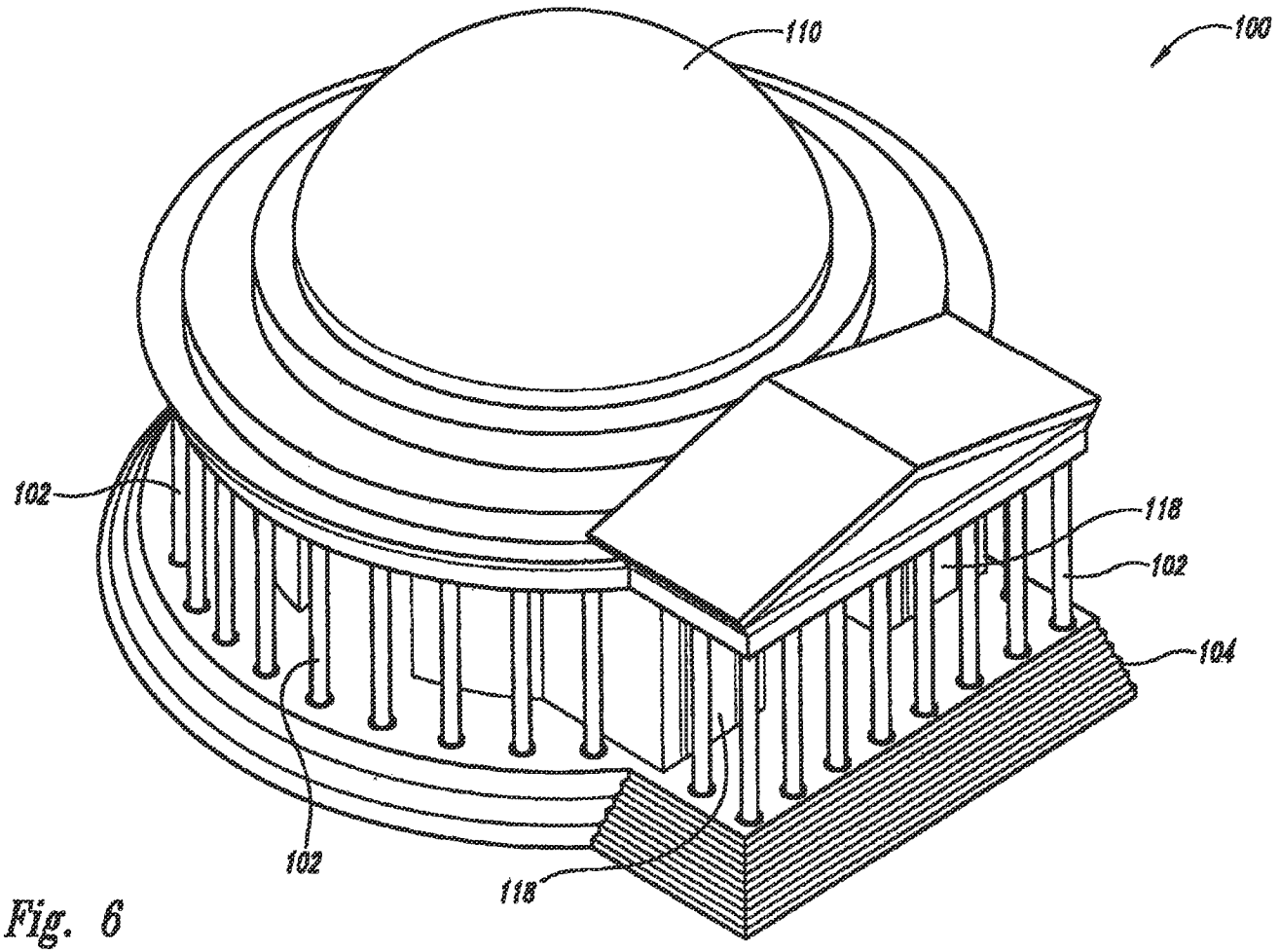
FIG. 6 is a perspective view of the cenotaph memorial facility of FIG. 5.

FIG. 5 is a front elevational view of yet another configuration of the external structure of the cenotaph memorial facility 100. FIG. 6 is a perspective view of the cenotaph memorial facility 100 of FIG. 5. The configuration illustrated in FIGS. 5-6 generally circular in shape, as may be found in monuments such as the Jefferson Memorial, the Pantheon, or the like. Access to an interior portion of the cenotaph memorial facility 100 in FIGS. 5-6 is gained via one or more archway entries 118. However, the entries 118 could be modified to include doors. Again, the size of the cenotaph memorial facility 100 may be sealed to accommodate the desired number of crypts.

Although FIGS. 1-6 illustrate three sample embodiments of the cenotaph memorial facility 100, those skilled in the art will appreciate that the cenotaph memorial facility may be in virtually any external configuration. For example, the cenotaph memorial facility 100 may be implemented in the form of a pentagon or a star. These shapes may be considered appropriate for a cenotaph memorial facility dedicated to a military figure. The cenotaph memorial facility 100 may be constructed in the shape of a large soccer ball or basketball if the honoree was a sports figure. The cenotaph memorial facility 100 may be in the shape of a musical instrument (e.g., a guitar) if the honoree was a musician. However, the present disclosure is not limited by any specific external configuration of the cenotaph memorial facility 100.

Figure 7:
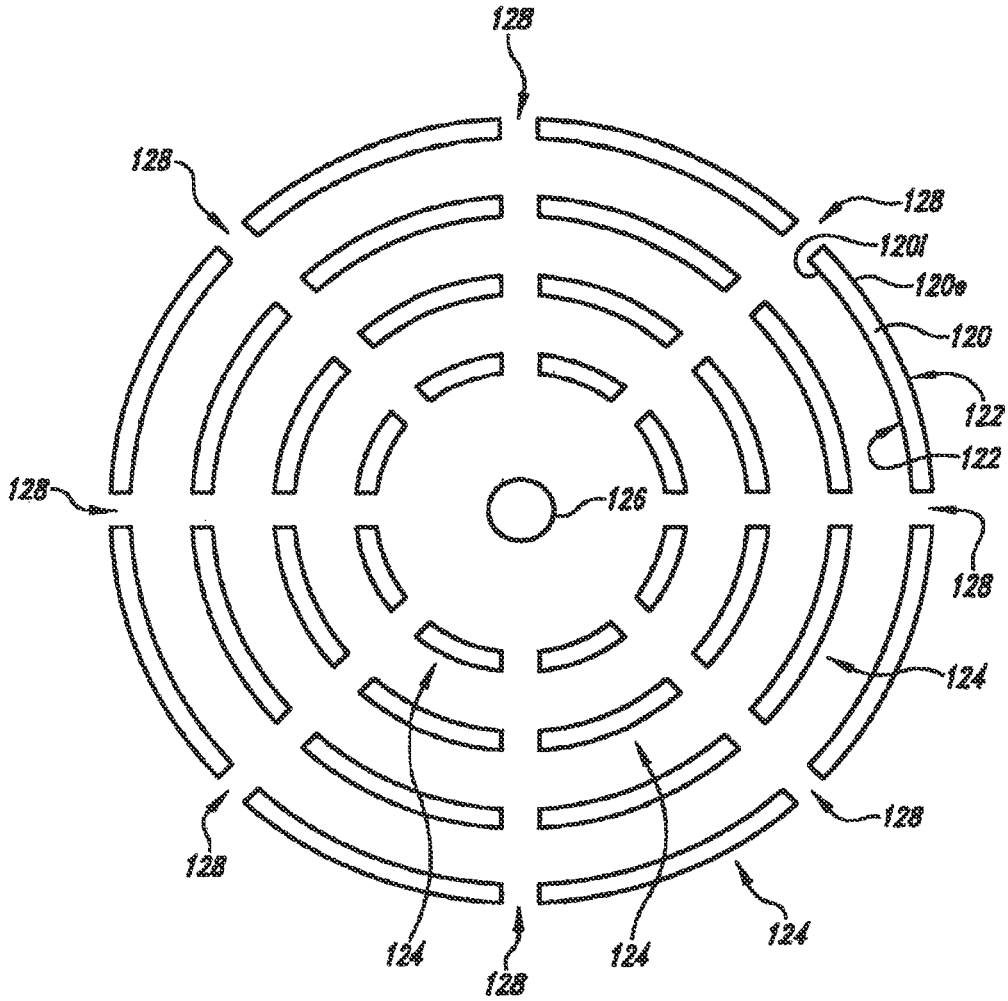
FIG. 7 is a top view of an interior portion of the cenotaph of FIG. 5 illustrating an arrangement of crypts within the cenotaph memorial facility.

FIG. 7 illustrates an arrangement of walls 120 used to house a plurality of crypts 122. The walls 120 are arranged in a pattern of broken concentric circles 124 surrounding an optional central memorial 126. The circular arrangement in FIG. 7 is well suited to serve as an internal arrangement of walls 120 the circular configuration of the cenotaph memorial facility 100 illustrated in the embodiments FIGS. 3-6. However, the circular arrangement of FIG. 7 may be used with other external configurations for the cenotaph memorial facility 100. Indeed, the arrangement of the walls 120 in FIG. 7 could be part of a standalone outdoor arrangement. This "Stonehenge" type of arrangement could in itself constitute yet another embodiment of the cenotaph memorial facility 100.

The broken areas in each of the concentric circles 124 form a series of aisles 128 that converge toward the central memorial 126. FIG. 7 illustrates eight converging aisles 128. However, the interior structure could be configured with fewer aisles 128, each having a broader aisle way leading toward the central memorial 126.

In FIG. 7, the crypts 122 are shown as mounted in an interior wall portion 120i of the walls 120 as well as on an exterior portion 120e of the walls 120. However, the crypts 122 may be mounted in only the interior portion 120i or the exterior portion 120e of the walls 120.

The optional central memorial 126 is illustrated generically in FIG. 7. However, those skilled in the art will appreciate that the central memorial 126 may be implemented in a variety of configurations. For example, the central memorial 126 may be in the form of a large statue of the honoree in many possible configurations, such as standing, sitting, engaged in an activity (e.g., a general on horseback), or the like. Alternatively, the central memorial 126 may be in the form of a tomb or other structure to honor the honoree. The cenotaph memorial facility 100 is not limited by any specific form of the central memorial 126.

In addition, the cenotaph memorial facility 100 may include biographical, historical, or other noteworthy information concerning the honoree. For example, the cenotaph memorial facility 100 may include photographs, sound recordings, video clips, or other multimedia information related to the honoree that may be viewed by visitors to the cenotaph memorial facility 100. For example, if the honoree is a political figure, original speeches or video clips of speeches may be provided. If the honoree is a military figure, the cenotaph memorial facility 100 may have plaques, medals, uniforms, maps of military campaigns, or other items of interest associated with the honoree. If the honoree is a movie star or rock star, the cenotaph memorial facility 100 may include clips from famous movies, Oscar awards, soundtracks from famous records, Grammy awards, and the like associated with the honoree. In this sense, the cenotaph memorial facility 100 may be a form of "museum" that includes artifacts related to the honoree. Although the cenotaph memorial facility 100 may be open to the public, in some embodiments, an admission fee may be charged.

Figure 8:
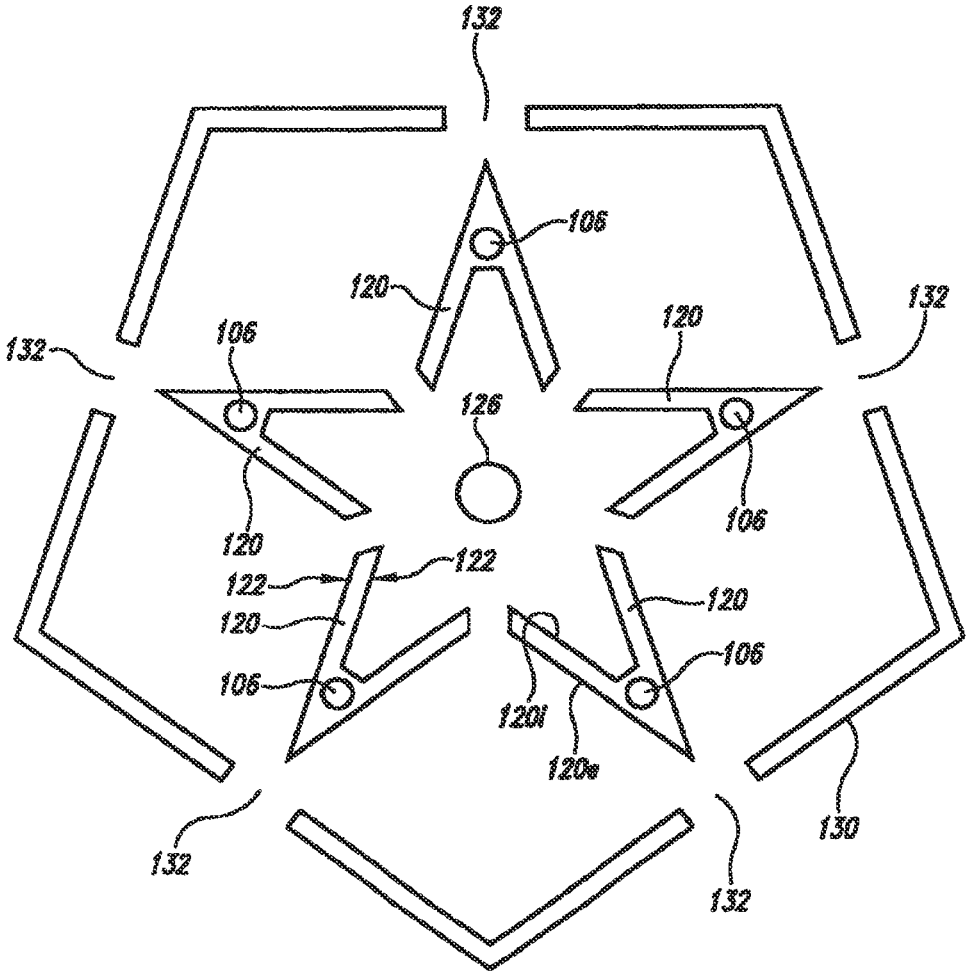
FIG. 8 is a top view of an alternative arrangement of crypts within a cenotaph memorial facility.

FIG. 8 illustrates alternative configurations for the walls 120. In this embodiment, an outer wall 130 is formed in the shape of a pentagon having entryways 132 in a central part of each side wall of the pentagon. In one embodiment, the outer walls 130 may serve as support walls for a roof structure (not shown) covering the outer walls to form a large pentagon-shaped covered cenotaph memorial facility 100. In this embodiment the crypts 122 may not be located on exterior portions of the outer walls 130. However, crypts 122 may be arranged along the interior portion of the outer walls 130. In addition, interior walls within the pentagon-shaped cenotaph memorial facility 100 may provide additional space for more crypts 122. In the exemplary embodiment of FIG. 8, the interior walls 120 are arranged in the shape of a star with one point of the star pointing towards each of the entryways 132. At each point of the stars in the walls 120, ornamentation 106 may be placed such that it is visible from the respective entryways 132. The ornamentation 106 in FIG. 8 may take the form of statues, or other memorials. In addition, FIG. 8 illustrates the optional central memorial 126 in the center of the star.

In another alternative embodiment, the entire structure illustrated in FIG. 8 may be an external structure with no roof. In this embodiment, crypts 122 may be located on both interior and exterior portions of the outer walls 130 as well as interior and exterior portions 120i and 120e of the walls 120.

Figure 9:
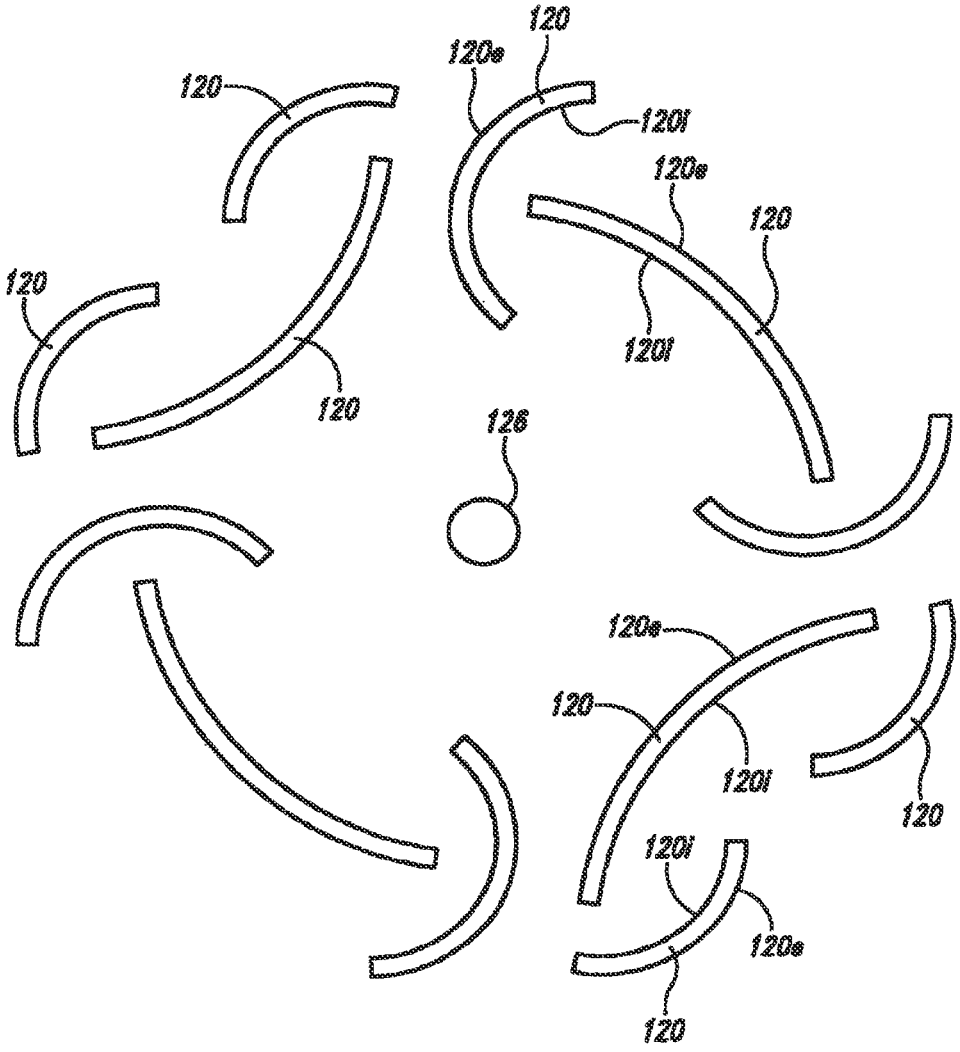
FIG. 9 is a top view of yet another alternative arrangement of crypts within a cenotaph memorial facility.
Figure 10:
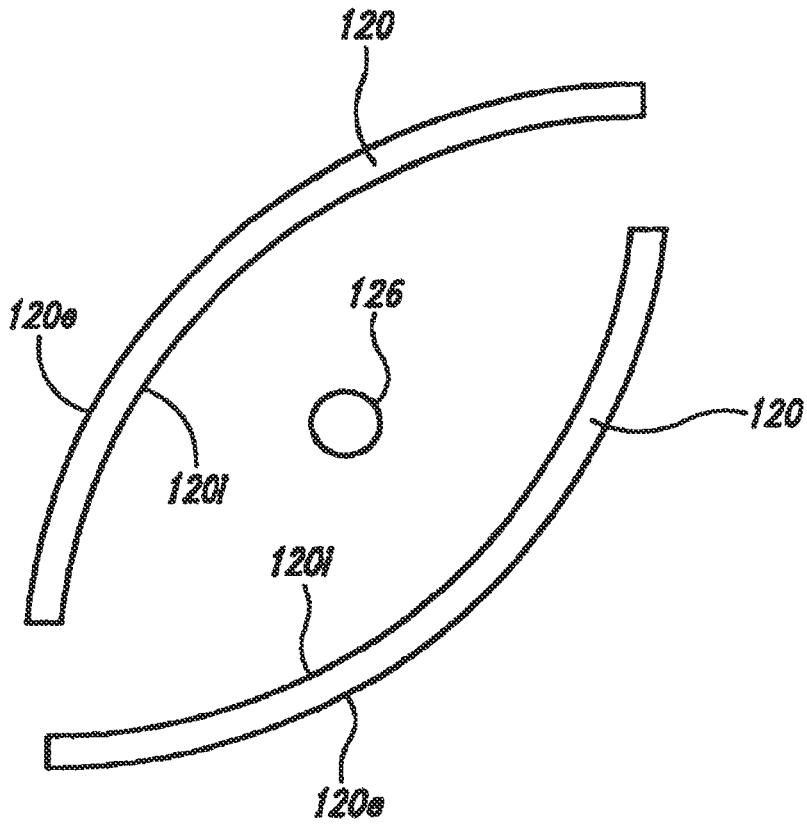
FIG. 10 is a top view of yet another alternative arrangement of crypts within a cenotaph memorial facility.

FIGS. 7 and 8 illustrate geometric patterns for the walls, such as circles, pentagons, and stars. However, the walls 120 may be constructed in other shapes, including fanciful shapes, as illustrated in FIGS. 9-10. The walls 120 in FIGS. 9-10 may be constructed as interior walls within a covered cenotaph memorial facility 100 or may be constructed out of doors, thus forming the cenotaph memorial facility itself. Crypts 122 may be mounted in the interior portions 120i and/or the exterior portions 120e of the walls 120.

Figure 11:
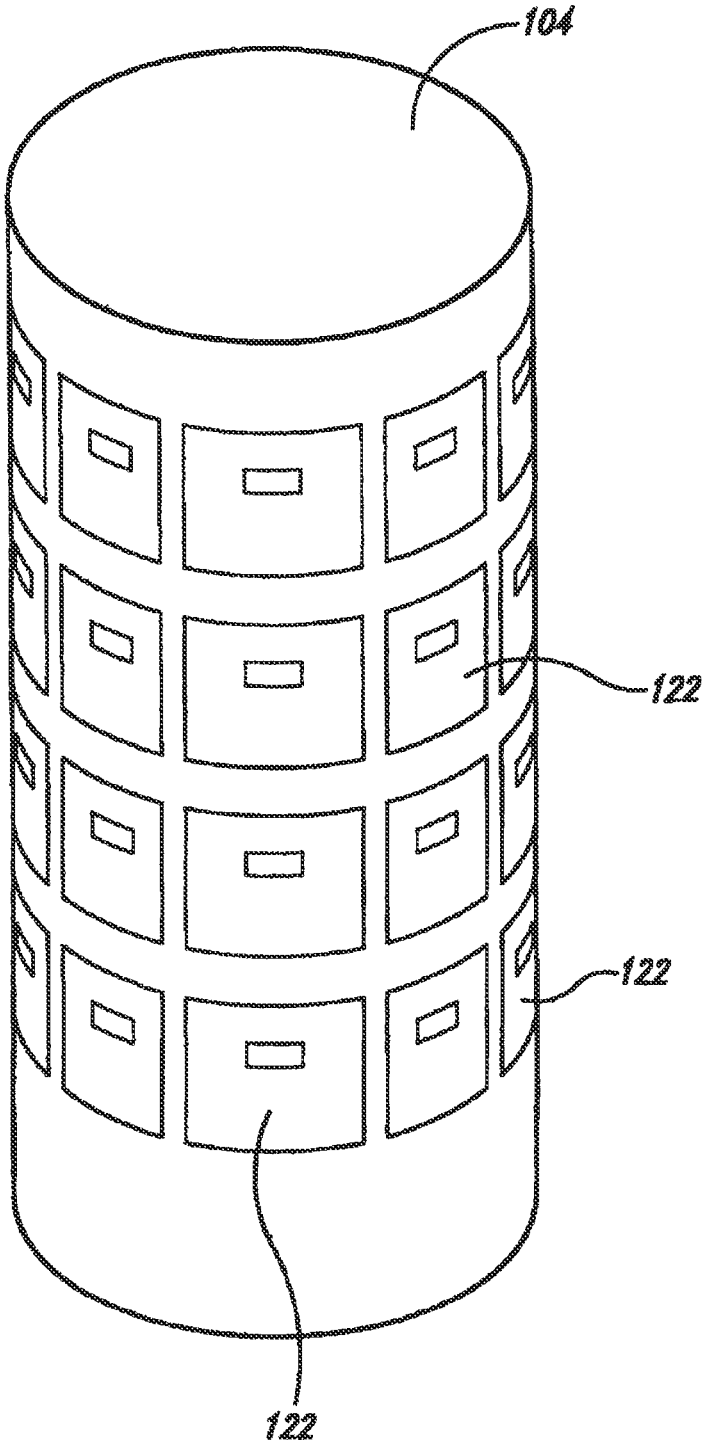
FIG. 11 illustrates crypts configured for installation within a column in the cenotaph memorial facility.

In yet another alternative embodiment, the crypts 122 may be mounted within the columns 104, as illustrated in FIG. 11.

Figure 12:
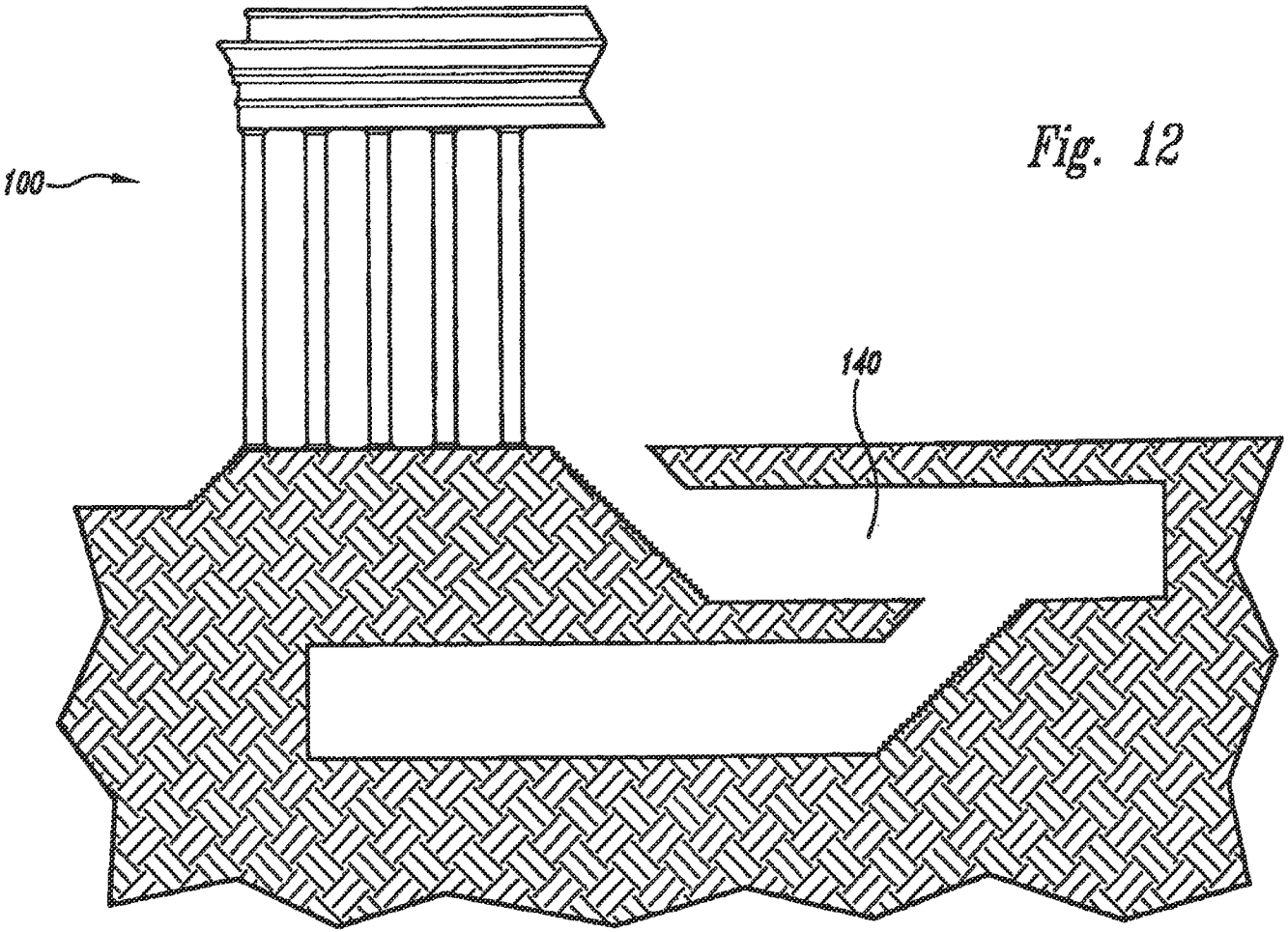
FIG. 12 is a partial cross-sectional view of the cenotaph of FIG. 1 illustrating a subterranean area for the installation of crypts within the cenotaph memorial facility.

In yet another alternative embodiment, FIG. 12 illustrates the cenotaph memorial facility 109 with a subterranean chamber 140 that includes additional crypts 122. The subterranean chamber 140 may contain crypts in addition to the crypts located above ground level within the cenotaph memorial facility 100. The arrangement of walls 120 within the subterranean chamber may be in any convenient arrangement, including, but not limited to, those arrangements illustrated in FIGS. 7-11. As illustrated in the cross sectional view of FIG. 12, the subterranean chamber 140 may include multiple levels in which the crypts 122 may be placed.

Figure 13:
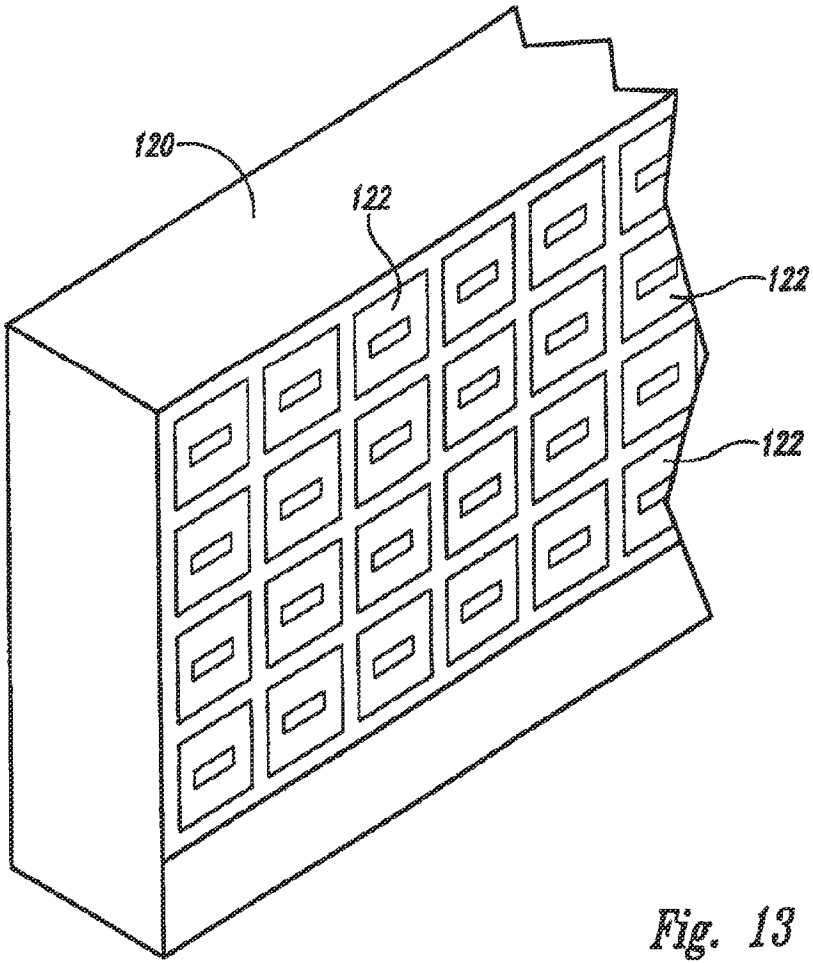
FIG. 13 is a partial view of a wall illustrating individual crypts.
Figure 14:
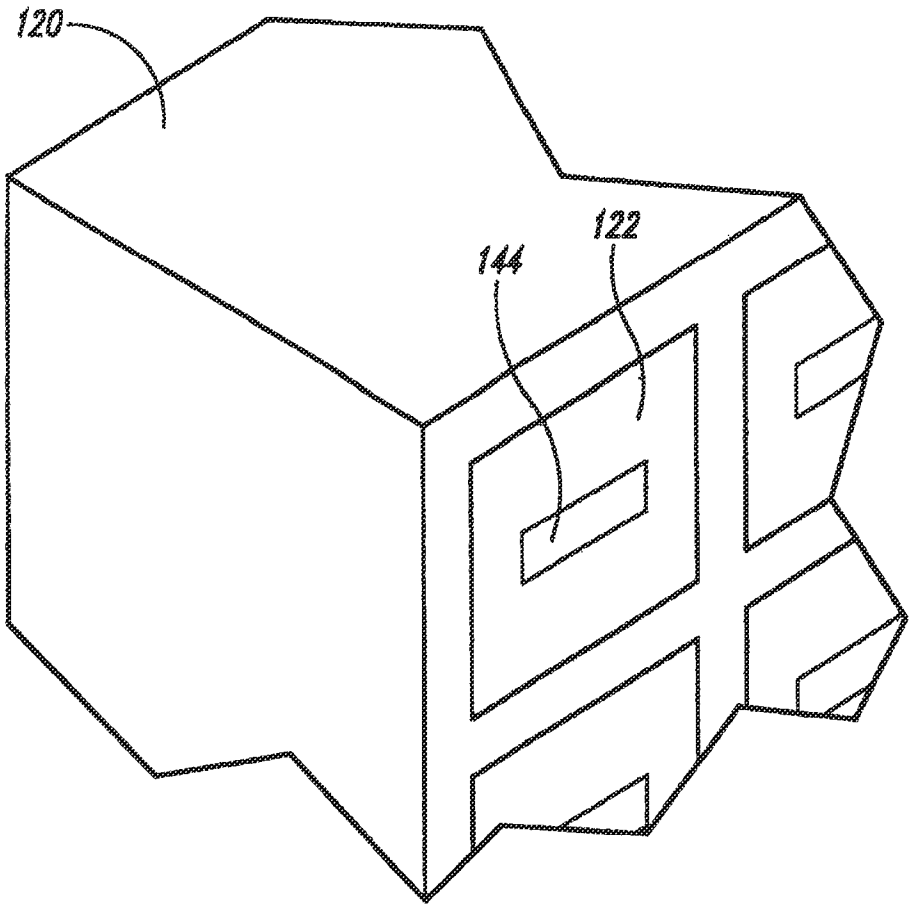
FIG. 14 is a close up view of the wall of FIG. 13, illustrating a crypt.
Figure 15:
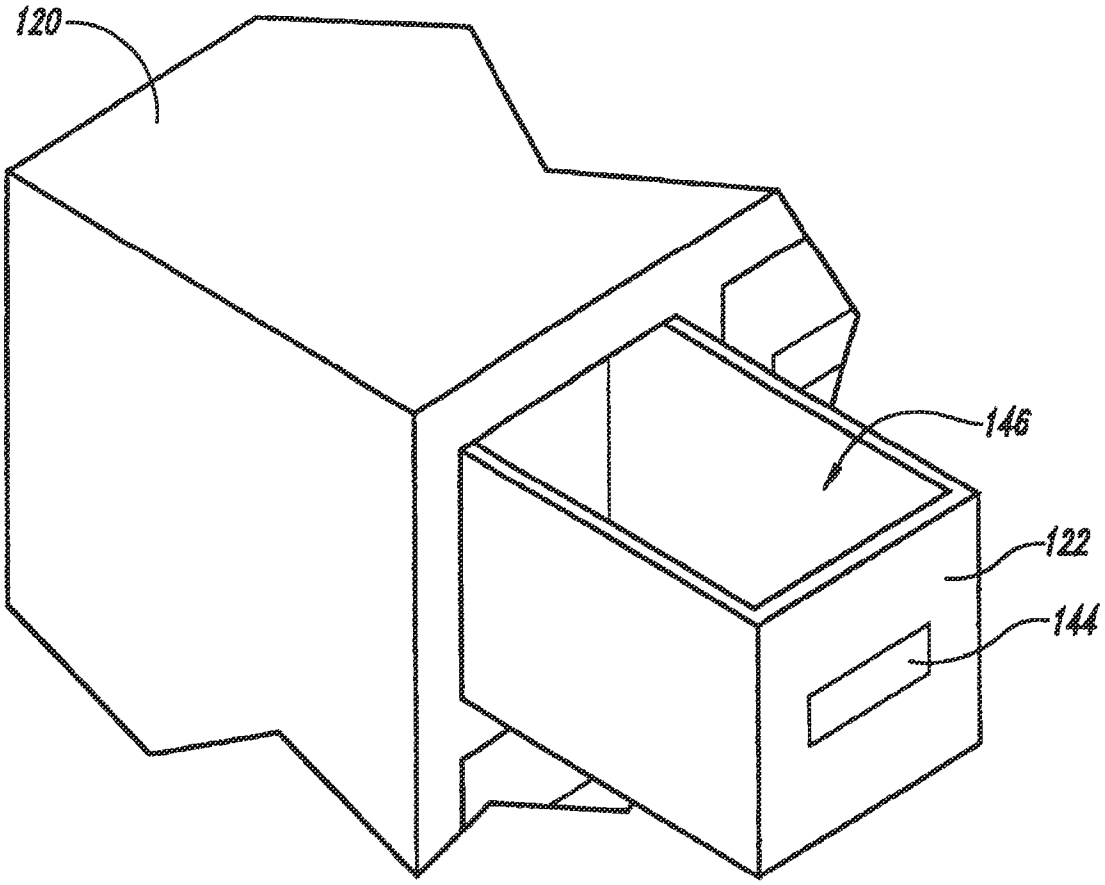
FIG. 15 is a view illustrating one possible configuration of the crypt of FIG. 14.
Figure 16:
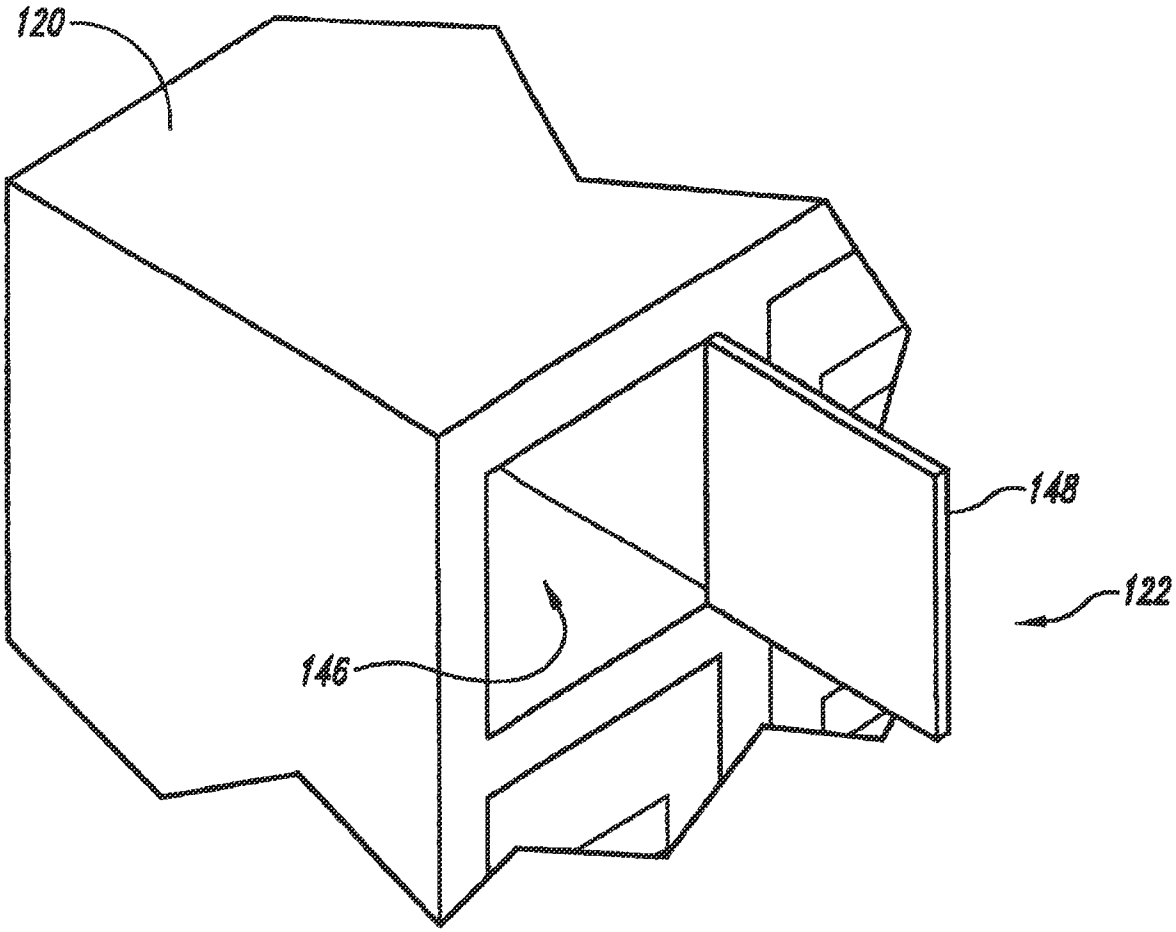
FIG. 16 is a view of an alternative arrangement of the crypt of FIG. 14.

FIG. 13 illustrates a close-up fragmentary view of the wall 120 and a plurality of crypts 122. The crypts 122 may be mounted in one or both sides of the wall 120. FIGS. 14-17 illustrate various embodiments of the crypt 122. As seen in FIG. 14, the crypt 122 may include a label 144 that identifies the individual whose cremated remains are placed within the crypt. In some cases, the label 144 may simply be a number to identify a particular crypt if the owner wishes to remain anonymous. Alternatively, the name of the owner and/or others who are memorialized within the crypt may be identified on the label 144. As seen in FIG. 15, the crypt 122 may, in one embodiment, comprise a drawer arrangement in which the crypt is pulled out from the wall 120 to gain access to an interior portion 146 of the crypt 122. FIG. 16 illustrates an alternative embodiment of the crypt 122 in which access to the interior portion 146 of the crypt 122 is gained via a door 148. Accessibility to the interior portion 146 of the crypt 122 allows the owner to add or remove items over the course of time. Indeed, an owner may place items within the interior portion 146 of the crypt 122 even before the death of the owner and the interment, if any, of the owner's remains within the crypt 122. Even after the death of the owner, the crypt 122 may be maintained as a memorial even though it may not contain the remains of the deceased owner. Thus, the owner may or may not be interred within the crypt 122.

Figure 17:
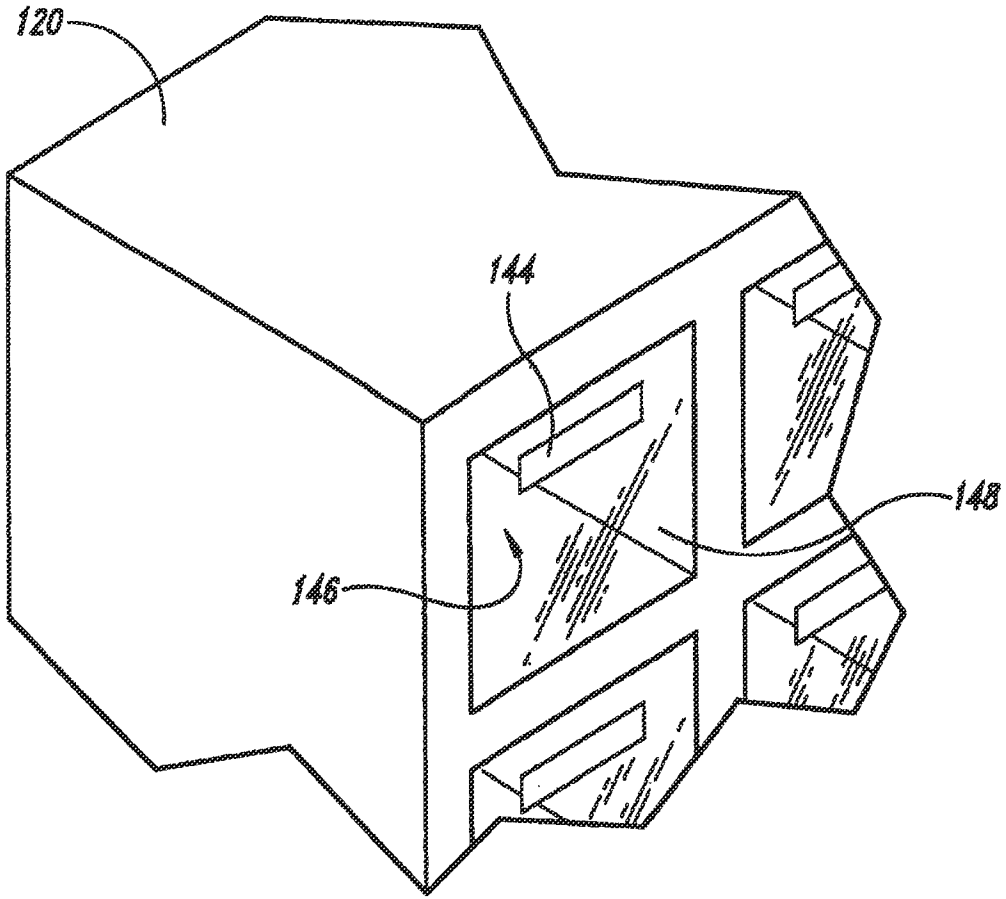
FIG. 17 is yet another alternative view of an alternative arrangement of the crypt of FIG. 14.

In yet another alternative embodiment, FIG. 17 illustrates a crypt with a transparent door 148. The transparent door 148 allows visitors to view memorials, such as photographs, letters, awards, or other memorabilia associated with the deceased. Regulations in some states or locales may have a requirement that any remains of an individual be contained within a sealed chamber. In one embodiment, the crypt 122 may comprise a sealed chamber portion and the interior portion 146, which is accessible in the manner described above.

Although not illustrated in FIGS. 14-17, locking mechanisms are provided for security and to prevent unauthorized access to the interior portion 146 of the crypt 122. In one embodiment, the crypt 122 may be equipped with a single key, which is in the possession of the owner. Alternatively, the crypt 122 may include a two-key system, as is common in a safe deposit box. One key is possessed by the owner while a second key is in the possession of the operator of the cenotaph memorial facility 100. In order to gain access to the interior portion 146 of the crypt 122, both keys must be used.

In another aspect of the present disclosure, the cenotaph memorial facility 100 may include a plurality of video cameras 160 mounted at various locations throughout the cenotaph memorial facility 100. In one aspect, the video cameras 160 may serve to provide security in the cenotaph memorial facility. However, in another aspect, the video cameras 160 or other imaging devices are intended to provide remote viewing capability. That is, authorized individuals may remotely control a selected video camera (or multiple video cameras) to view a selected crypt 122 or to view other interior portions of the cenotaph memorial facility, such as the central memorial FIG. 126 (see FIG. 7) or ornamentation 106 (see FIG. 8). Those skilled in the art will appreciate that remote control of the video cameras 160 comprises functions such as focus, zoom, pan, tilt, and other conventional camera operations. Lights 162 may be mounted on or near the video cameras 160 to provide appropriate lighting. Alternatively, lights may be provided in the cenotaph memorial facility 100 to assure adequate lighting for operational use of the video cameras 160.

Figure 19:
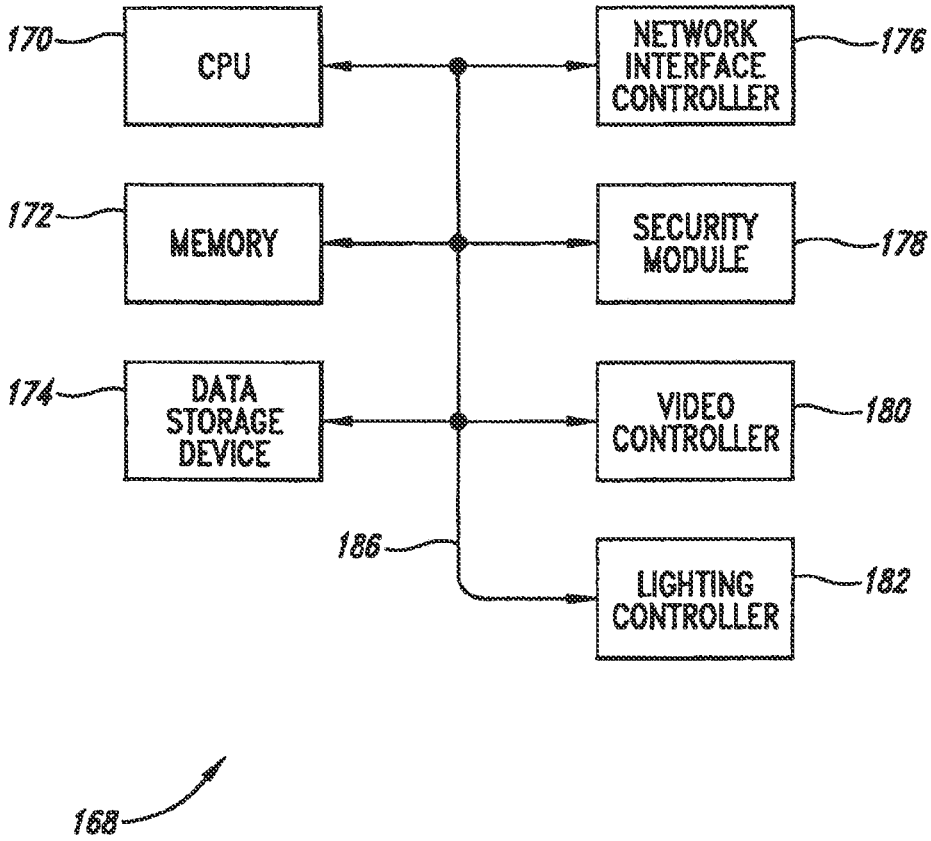
FIG. 19 is a functional block diagram of a computer system to operate in conjunction with the lighting and camera monitoring of FIG. 15.

FIG. 19 is a functional block diagram of a computer system 168 that allows remote viewing within the cenotaph memorial facility 100. The computer system 168 may typically be implemented by a personal computer (PC). The computer system 168 includes a central processing unit (CPU) 170 and a memory 172. In general, the memory 172 provides data and instructions for execution by the CPU 170. Those skilled in the art will appreciate that the CPU 170 may be implemented as a conventional microprocessor, application specific integrated circuit, digital signal processor, programmable gate array, or the like. The computer system 168 is not limited by the specific form of the CPU 170. Similarly, the memory 172 may include random access memory, read-only memory, programmable memory, internal or external flash memory, or the like. The computer system 168 is not limited by any specific form of hardware used to implement the memory 172. The memory 172 may also be integrally formed in whole or in part with the CPU 170.

The computer system 168 also includes a data storage device 174, which may comprise conventional mass data storage devices, such as a hard disk drive, tape drive, optical drive, or the like. For the sake of brevity, other conventional components, such as a display, keyboard, mouse, and the like are omitted from FIG. 19.

Figure 18:
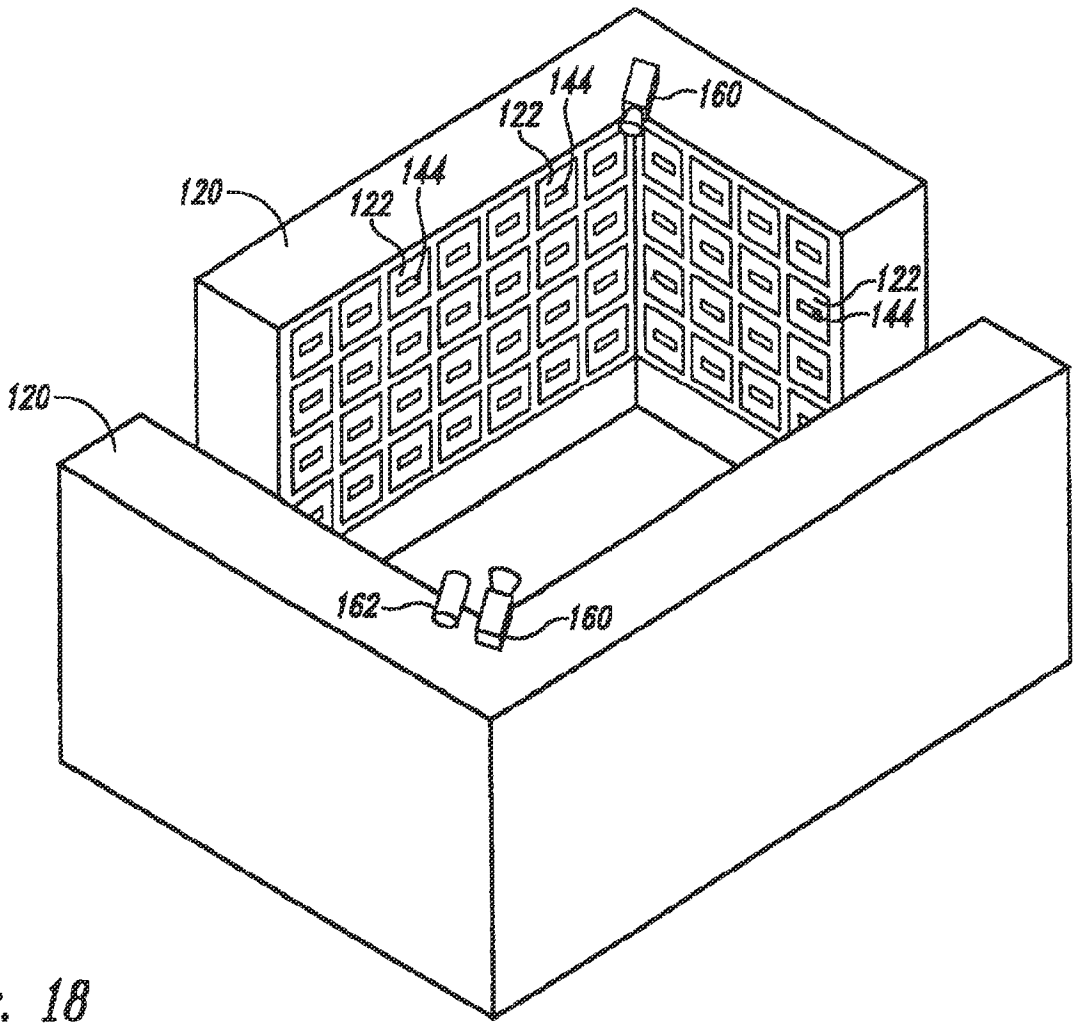

The computer 168 also includes a network interface controller (NIC) 176. As will be discussed in greater detail below, the NIC 176 allows remote access to and control of the video cameras 160 (see FIG. 18). A security module 178 serves to assure that access to the computer system 168 is provided only to authorized individuals. A video controller 180 provides control of the plurality of video cameras 160. A lighting controller 182 provides control for lighting within the cenotaph memorial facility.

The various components illustrated in FIG. 19 are coupled together by a bus system 186. The bus system 186 may include an address bus, data bus, power bus, control bus, and the like. For the sake of convenience, the various buses in FIG. 19 are illustrated as the bus system 186.

Those skilled in the art will appreciate that some of the blocks in the functional block diagram of FIG. 19 may, in fact, be implemented as a set of data instructions stored within the memory 172 and executed by the CPU 170. For example, the security module 178, video controller 180 and lighting controller 182 may be implemented, at least in part, by a set of computer instructions. However, these are illustrate as separate blocks in the functional block diagram of FIG. 19 because each performs a separate function.

In an example of operation, the computer system 168 may function as a server that hosts a website. The NIC 176 provides interconnectivity between the computer system 168 and a wide area network (not shown), such as the Internet.

In one embodiment, the website supported by the computer system 168 may have a public portion that can be viewed without any security access. The public portion may provide remote viewing of areas of the cenotaph memorial facility 100, such as the central memorial 126 or ornamentation 106. The public portion of the website may also include information about the honoree, such as biographic and/or historical information, soundtracks, video clips, or other multimedia presentation information. In this aspect, the cenotaph memorial facility 100 may be considered as a fusion of a "bricks and mortar" memorial/museum coupled with the delivery of digital content in the form of a "virtual" memorial/museum.

In one embodiment, viewers may remotely view portions of the cenotaph memorial facility 100 using the video cameras 160. In addition, high quality images, digital scans of objects and multimedia may be made available via the website supported by the computer system 168. In one embodiment, the public may freely access these portions of the website to view and/or download data. In another alternative embodiment, visitors to the website supported by the computer system 168 may have to pay a fee to view portions of the website or to download data from the website. In yet another alternative embodiment, owners of crypts 122 within the cenotaph memorial facility 100 may have free access to pardons of the website or to downloads for which members of the public may be charged a fee. The operator of the cenotaph memorial facility 100 may establish access rules and fee structures for visits and access to the virtual museum.

The website supported by the computer system 168 may also include a secure portion that is accessible only by authorized individuals. In this embodiment, an authorized individual may access the website via the internet. The user must provide valid identification data to any challenges presented by the security module 178. For example, the authorized individual may have to provide a user name and password to gain access to the website hosted by the computer system 168. Alternatively, the security module 178 may require additional information, such as identification of the crypt 122 to be remotely viewed by the authorized individual. Assuming that the individual provides the necessary authorization information, the security module 178 provides access to the secure portion of the website hosted by the computer system 168.

The authorized individual may view the video signal provide by one or more of the video cameras 160. For example, any authorized individual may view common areas of the cenotaph memorial facility 100, external view of the cenotaph memorial facility, the central memorial 126 or ornamentation 106. In addition, the authorized individual may have access to the video camera 160 that allows the individual to view a single selected one of the crypts 122.

To view an individual crypt, the authorized individual enters information to uniquely identify the selected crypt 122. The video controller 180 activates the video camera 160 in the area proximate to the selected crypt 122. Although not illustrated in FIG. 18, the video cameras 160 may include motorized mounts that allow the camera position to be altered to thereby aim the video camera 160 at the selected crypt and to focus the video camera on that selected crypt.

The lighting controller 182 operates in conjunction with the video controller 180 to assure adequate lighting for portions of the cenotaph memorial facility 100 that are remotely viewed by the authorized individual. That is, the lighting controller may control lights 162 that are mounted on or near the video cameras 160 and which are positioned therewith. Alternatively, the lighting controller 182 may adjust the lighting level of general lighting within the cenotaph memorial facility 100 to provide adequate lighting for the video camera within portions of the cenotaph memorial facility that are being remotely viewed by the authorized individual.

As described above, the website supported by the computer system 168 may also provide information about the honoree. For example, photographs, video clips, written documentaries and the like may all be provided for remote viewing by authorized individuals or by the general public. In addition, authorized individuals may access the secure portion of the website to view an individual crypt that the individual is authorized to view.

In yet another embodiment, the website supported by the computer system 168 may include information about the owner of one of the crypts 122, whether alive or deceased. If authorized, the website may provide information about one or more individuals interred in crypts 122 within the cenotaph memorial facility 100. For example, if the cenotaph memorial facility 100 is dedicated to a military leader or to a particular military group, individuals whose remains are interred in crypts may have served under the command of the honoree or are members of the group to which the cenotaph memorial facility is dedicated. If authorized, the website supported by the computer system 168 may provide information, such as historical information, photographs, video clips, and the like, concerning the deceased interred within the cenotaph memorial facility 100. Release of information about the deceased may be authorized for general release and made available on the unsecure portion of the website supported by the computer 168. Alternatively, the information about a deceased individual may be made available only to other authorized individuals visiting a secure portion of the website.

In yet another alternative, the information about the deceased individual may be made available only on an individual by individual basis. For example, the information may be made available only to family members of the deceased individual so that they may share memories of the deceased. Similarly, members of a group (e.g., a military group) may share access to a public portion of the website or a secure portion of the website to share information about other deceased members of the group that are interred at the cenotaph memorial facility 100. In this manner memories of the deceased may be shared.

Updates to the information concerning deceased individuals may be made in a conventional manner. The security module 179 prevents unauthorized access to the information about the deceased individuals to prevent tampering with the information.

As previously discussed, the operators of the cenotaph memorial facility 100 may provide information about the honoree and make that information available during actual visits to the cenotaph memorial facility as well as availability of information by visiting the website supported by the computer system 168. The operators of the cenotaph memorial facility 100 may provide high quality digital scans of objects as well as virtual access to multimedia presentations and other information regarding the honoree. In addition, crypt owners may also have information to contribute that relates to the honoree or to the owner of the crypt 122. For example, a cenotaph memorial facility 100 may be dedicated to a musician or "rock star." Fans of the honoree may place artifacts, or other memorabilia, in the individual crypts 122. However, in addition, the owners of the crypts 122 may make these objects available for viewing either remotely or by actual visitors to the cenotaph memorial facility 100. For example, a fan may have photographs of the rock star, concert ticket stubs, posters or other memorabilia related to the honoree. These objects may be digitally scanned and made available via the virtual museum. In one embodiment, all artifacts scanned for viewing in the virtual museum must be physically present in the cenotaph memorial facility 100, such as placement in one of the crypts 122. Alternatively, artifacts may be considered so valuable that they may be stored in a high security area within the cenotaph memorial facility 100 or at a separate facility.

Given the large number of crypts 122 that may be present in a single cenotaph memorial facility, the contributions of individual owners can create art extensive museum collection. A museum curator may be used to catalog and cross-reference materials as well as checking for authenticity. In addition, a curator could censor offensive materials and provide standards for artifacts to be scanned and displayed in the virtual museum.

In addition to artifacts that may be entered into the cenotaph memorial facility 100 or scanned and made available in the virtual museum, the individual owners of the crypts may also contribute commentary related to the honoree. For example, a cenotaph memorial facility may be dedicated to a military leader. Individuals who served under that military leader may have physical artifacts that can be displayed in the manner described above. In addition, those individuals may have personal memories of the honoree and other members of the military group. The operator of the cenotaph memorial facility 100 may prescribe standards for interviews that may be recorded and made available to visitors to the cenotaph memorial facility or visitors to the virtual museum. For example, World War II veterans who served under a particular military commander may have a treasure trove of memories regarding their period of service under that commander. The opportunity to record such memories and to make such memories available to the public provides an extraordinary opportunity to preserve history regarding the honoree as well as the owners of the crypts 122 within the cenotaph memorial facility 100.

A curator may cross-reference the information and provide computer links to different portions of the website supported by the computer system 168. For example, many owners of crypts 122 may have been involved in a particular battle (e.g., the Battle of the Bulge). Visitors to the virtual museum may be viewing information regarding the honoree and see a link to the Battle of the Bulge. By clicking on the link, the visitor to the virtual museum may be directed to comments from different individual owners of crypts 122 regarding their experiences in the Battle of the Bulge and their historical recollections of the honoree in the Battle of the Bulge. Similarly, other links and cross-references to different portions of the virtual museum can be provided to help guide a visitor and to provide a more thorough and rewarding experience.

In another example of the virtual museum, a crypt owner may have an artifact, such as a towel or scarf, given to them by a rock star during a concert performance. If actual footage of the performance is available, or footage of the rock star giving the artifact to the fan, the curator may provide a link in the virtual museum that allows a visitor to the virtual museum to view the artifact and to click on the link and see the rock star handing that artifact to the fan.

Various aspects of viewing authorization have been described above. Some portions of the virtual museum may be publically available for fine or for a fee while access to other portions of the virtual museum may be restricted. For example, portions of the virtual museum may be restricted only to owners of crypts 122 or to those designated by the owner, such as close friends and relatives. In another aspect of the cenotaph memorial facility 100, owners of the crypts 122 may be able to exchange information and memories with each other. For example, a cenotaph memorial facility 100 dedicated to a rock star may have fans who wish to share their memories with each other. Similarly, members of a military group may also have the opportunity to share collective memories of the honoree with whom they served. The cenotaph memorial facility may provide contact information that would allow owners of the crypts to communicate with each other in the form of a social network. These memories may be ad hoc memories or may be recorded for posterity and shared within the virtual museum.

In yet another aspect, visitors to the virtual museum may find links to advertising. For example, visitors to a cenotaph memorial facility 100 dedicated to a rock star may find links to sources of recordings of that honoree.

A description of the crypts 122 or other areas of the cenotaph memorial facility 100 have been discussed above. In another embodiment, visitors to the cenotaph memorial facility 100 may access an interactive guide located in or near the cenotaph memorial facility 100. For example, the visitor may view information about the honoree in the manner described above with respect to remote access of such information. In another aspect, the interactive guide may allow a visitor to query the name of a deceased or other owner of a crypt 122 to thereby identify the location of the specific crypt. In addition, the local interactive guide may provide a visitor with such information as the owner or deceased may have wished to be made public. Such information about a deceased or owner may be made generally available to the public. Alternatively, complete information about a specific individual interred with the cenotaph memorial facility 100 may be restricted. A visitor may have to enter a security code to access restricted information. For example, all information about a particular owner may be available to a visitor on the local interactive guide. Alternatively, a limited set of information may be publically available while other information is available only to those having the proper security code. In yet another alternative embodiment, all information is restricted to the public and information about an individual is available on the local interactive guide only to those individuals having the proper security code.

The cenotaph memorial facility 100 may also be equipped with security features to prevent unauthorized access to the facility itself and to prevent unauthorized access to any of the crypts 122. The security system may include the video cameras 160 as well as other conventional alarm mechanisms. For example, each crypt may be equipped with a security alarm that detects the unlocking or opening of the crypt 122. The security system may be centrally monitored at the cenotaph memorial facility itself or may be remotely monitored by security service providers. In yet another alternative embodiment, the security system could be remotely tied into a communication system of the owner for remote security monitoring.

The cenotaph memorial facility 100 described herein can be constructed using a wide variety of shapes for the external structure and may support a wide variety of arrangements of interior walls 120 within the external sanctum. Those walls may contain a large number of crypts 122 arranged on one or both sides of walls. The walls may also be constructed as free-standing outdoor structures. The specific shape, size and details of the cenotaph memorial facility 100 can vary based on factors, such as the number of crypts to be contained therein, the property size of the area in which the cenotaph memorial facility 100 will be constructed, local zoning ordinances, and the like. The present disclosure is not intended to limit the cenotaph memorial facility 100 to any specific external structure or arrangement of walls 120.

Similarly, the specific size and arrangement of crypts 122 within the cenotaph memorial facility 100 may vary widely. The specific dimensions of the individual crypts are not critical to a satisfactory understanding of the cenotaph memorial facility 100 or its operation. In one embodiment, the crypt 122 may be, by way of example, 6"×6" and have a depth of 6"-12". However, these dimensions may vary in accordance with a number of different criteria. For example, crypts 122 mounted within the column 104 (see FIG. 11) may be smaller in size so that the column 104 still provides the necessary structural support and is not weakened by the introduction of the crypts within the column. However, the cenotaph memorial facility 100 is not limited by the specific size or shape of the crypts 122. The computer system 168 and cameras 160 provide remote viewing of the cenotaph memorial facility 100 in general and, more particularly, may provide authorized users with the ability to view the individual crypt 122. This feature may be particularly desirable if the crypt contains the transparent door 148 (see FIG. 17) so that authorized individuals may remotely view the items placed within the interior portion 146 of the crypt 122.

Thus, the cenotaph memorial facility 100 provides a means by which deceased individuals may be interred in a facility dedicated to a specific honoree.

Figure 20:
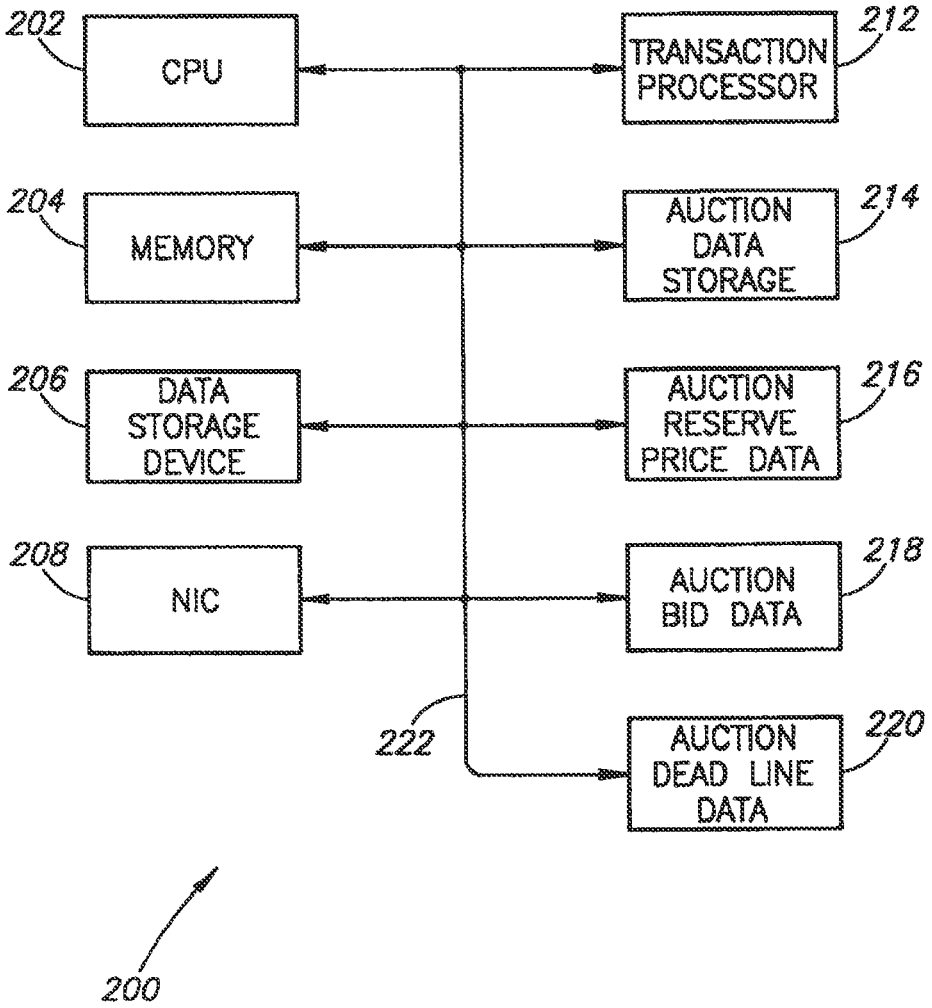
FIG. 20 is a functional block diagram of a system to control an on-line auction process for the cenotaph memorial facility.

In yet another aspect, the cenotaph memorial facility 100 may include an on-line auction system 200, illustrated in FIG. 20. The on-line auction system 200 incorporates elements that are not found in conventional on-line auctions that materially enhance the functionality and reliability of the auction process as well as the value of the auction process to persons selling items and to those buying items related to the honoree via the cenotaph memorial facility on-line auction. By focusing only on auction items related to a single person (i.e., the honoree), the cenotaph memorial facility 100 creates a marketplace unlike super market-style on-line auction processes that sell thousands of diverse and unrelated goods. The on-line auction system 200 of the cenotaph memorial facility 100 brings together a community of persons who, collectively, possess what may be the world's largest collection of memorabilia and artifacts relating the honoree, much of which may become available for sale via the on-line auction, and superior knowledge concerning the items to be auctioned.

The on-line auction system 200 of the cenotaph memorial facility 100 is utilized by a community of sellers and buyers having a demonstrated passion for items related to the honoree, who are part of a defined community, and who typically will have a level of knowledge about the honoree and items relating to the honoree superior to that of the general public. That is, the buyers and sellers in the on-line auction system 200 of the cenotaph memorial facility have generally paid substantial sums to purchase a crypt 122 (see e.g., FIG. 13) or may have paid substantial sums of money to become part of an adjunct membership group associated with the cenotaph memorial facility and dedicated to the honor of the honoree. This close affiliation or "quasi-membership" enhances the quality of the items to be sold by the on-line system 200 of the cenotaph memorial facility 100. This process also enhances the intensity of interest of likely bidders, the efficiency and effectiveness of the on-line auction process, and the authenticity of merchandise to be auctioned, and the reliability of auction outcomes.

For example, the cenotaph memorial facility 100 may own artifacts available for auction. In another example, individuals may privately own artifacts related to the honoree of the cenotaph memorial facility 100. In this example, the private individuals may utilize the on-line auction services of the cenotaph memorial facility 100 to auction off the artifacts. The individuals providing artifacts for auction may be owners of one or more crypts 122 within the cenotaph memorial facility or may be individuals having no business relationship with the cenotaph memorial facility 100, but merely utilizing the on-line auction system 200 of the cenotaph memorial facility.

Activities of a curator have already been described above with respect to the cenotaph memorial facility 100. In an embodiment using the on-line auction capability of the cenotaph memorial facility 100, many or most of the items in the auction may be examined and logged by the curator. This information, as well as the entirety of the archival database created by the curator listing all items housed or exhibited at the cenotaph memorial facility 100, will be available to persons participating in the auction. This process allows potential bidders to learn more about the origin, history, authenticity and value of the auctioned items, and to make better comparison of the auctioned items with other items related to the honoree. This additional information gives prospective bidders a source of information beyond the self-serving representations to which most bidders are exposed during ordinary on-line auctions. This additional information means that auctioned items may have a greater reliability as to authenticity, thus increasing the reliability and authenticity of items to be auctioned and thereby increasing the overall reliability of the auction process conducted by the cenotaph memorial facility 100. This, in turn, will increase the amount that buyers may be willing to pay, and sellers will receive, for items auctioned by the on-line auction system in the cenotaph memorial facility 100.

In one embodiment, the on-line auction system 200 of the cenotaph memorial facility 100 may offer auction items to a limited and well defined group of potential bidders. For example, if the honoree of the cenotaph memorial facility 100 is an individual, the auction may be limited to those individuals who have purchased a crypt 122 (see e.g., FIG. 13) or to people who are otherwise linked to the memorabilia of the single person honoree. The on-line auction system of the cenotaph memorial facility may limit the community of potential bidders in other ways. Alternatively, the on-line auction system 200 of the cenotaph memorial facility 100 may be open to the public without limitation. The manager of the auction will determine the level of access to the auction that will produce the most desirable outcomes of the auction for buyers and sellers.

The on-line auction system 200 of the cenotaph manorial facility 100 will be described in greater detail below. However, those skilled in the art will recognize that an auction may also include a combination of a live auction and incorporate on-line auction system 200 in conjunction with live auctions in person. An advantage of the on-line auction system 200 of the cenotaph memorial facility 100 is that additional technology may be useful in the bidding process. For example, a user computer (not shown) may have split screen display or multiple display screens on a computer system to show various pieces of information related to the on-line auction. For example, one screen (or a portion of a display screen) could show a picture of an auction item while the second display (or second portion of a single display) can show additional related information. The related information could be text information or blog information posted by potential bidders or commentary from individuals having certain knowledge of the auction item. Other known communication techniques, such as a Twitter™ account could be used to provide additional commentary regarding the auction item.

FIG. 20 is a function block diagram illustrating the system 200 used to implement the on-line auction process. Many of the components illustrated in the functional block diagram of FIG. 20 may be implemented by like or similar components in the computer system 168 illustrated in FIG. 19. However, for the sake of clarity, the functional block diagram of FIG. 20 is illustrated as a separate system (i.e., the system 200) because it performs different functions than the computer system 168. The system 200 includes a CPU 202 and a memory 204. In general, the memory 204 provides data and instructions for execution by the CPU 202. As discussed above with respect to the CPU 170 and memory 172, the CPU 202 and memory 204 may be implemented using a number of different known technologies or combinations of technologies. The system 200 is not limited by the specific hardware implementation of the CPU 202 and memory 204.

The system 200 also includes a data storage device 206, which may be implemented as one or more conventional mass storage devices, such as hard disk drives, tape drives, optical drives (e.g., CD or DVD), or the like. As with the computer system 168, the functional block diagram of FIG. 20 does not include other conventional components, such as a keyboard, mouse, display, and the like.

The system 200 also includes an NIC 208. As will be discussed in greater detail below, the NIC 208 controls communications with a network, such as the Internet, to provide detailed information regarding the items available for auction and to communicate with bidders during the auction itself. The NIC 208 may include conventional encryption technology to provide security that protects the identities of the individual bidders and protects financial information, such as bank accounts, credit card numbers, and the like, that will be used to complete the transaction when the bidding process has ended.

A transaction processor 212, which will be described in greater detail below, controls the auction process. Those skilled in the art will appreciate that the transaction processor 212 may be implemented by a set of instructions in the memory 204 that are executed by the CPU 202. However, the transaction processor 212 is illustrated as a separate block in the functional block diagram of FIG. 20 because it performs a specific function.

A number of data storage elements are also illustrated in FIG. 20. An auction data storage 214 contains data related to the artifacts being offered in the auction. This includes, but is not limited to, a description of the item, photographs and/or multimedia files depicting the articles. Supporting documentation, such as a photograph illustrating the honoree wearing or using the article, may also be stored in the article data storage 214. This type of documentation may serve as a form of provenance to demonstrate the authenticity of the article and support the estimated value. The auction data storage 214 may also include a valuation by the curator or description of the article as well as an estimated auction value. In one embodiment, the auction items may be photographs or multimedia displays of the honoree or other articles related to the honoree.

An auction reserve price data storage 216 may store the reserve price for the auctioned items. Those skilled in the art will appreciate that an owner of the article may set a minimum bid price, sometimes known as the reserve price, which must be met for the item to be auctioned. If all bids remain below the auction reserve price, there will be no auction winner and the particular item will remain unsold.

Also illustrated in FIG. 20 is an auction bid data storage area 218. During the auction process, the auction bid data storage area 218 may store a history of all bids for a particular item or, in an alternative embodiment, may only store the last selected number (e.g., the last five) bids for a particular item.

An auction deadline data storage area 220 may store date and time information related to a termination of the auction. As those skilled in the art will appreciate, on-line auctions are sometimes conducted over a period of hours or days. In such extended auctions, bidders may return to an auction website associated with the cenotaph memorial facility 100 and check the current bid price. The bidder may, if they choose, submit a higher bid prior to the auction deadline. Such auctions often exhibit a great deal of bidding activity as the auction deadline approaches. In an alternative embodiment, an auction may be conducted in real-time where multiple bidders may each enter bids until a manual termination of the auction is reached when there are no more bids.

Those skilled in the art will appreciate that the various data storage areas 214-220 may be implemented as a portion of the memory 204 or may be stored, by way of example, in the data storage device 206. For example, data such as the auction bid data storage 218 and the auction deadline data storage 220 may be stored in the memory 208 while other data, such as the auction data storage 214 in the auction reserve price data storage area 216 may be stored in the data storage device 206.

The various components illustrated in FIG. 20 are coupled together by a bus system 222. The bus system 222 may include an address bus, data bus, power bus, control bus, and the like. For the sake of convenience, the various buses in FIG. 20 are illustrated as the bus system 222.

In operation, the system 200 functions as a server and responds to queries for auction item information as well as processing auction bids using the NIC 208. In one embodiment, the system 200 may be a server hosting an auction website accessible to bidders via the NIC 208.

When an item or items are made available for auction, the data describing the items is placed in the auction data storage 214. Bidders may access the auction data storage 214 via the NIC 208 to obtain information about the artifact offered for auction. In addition, the bidders may be able to obtain the auction reserve price data if the owner of the artifact wishes to make that information publicly available.

During the auction process, the transaction processor 212 accepts one or more bids from one or more individuals. The bids are stored in the auction bid data storage 218 and the current highest bid is identified. In some embodiments, the high bid data is also made available on line. Alternatively, the transaction processor 212 may prevent high bid data from being made publicly available. In this embodiment, a bidder must enter a proposed bid. If the proposed bid is less than the current value for the high bid, the transaction processor 212 will reject the bid without providing any guidance to the bidder with respect to the current high bid. The bidder may submit a new proposed bid. If the proposed bid, or new proposed bid, is higher than the value for the current high bid, the bid is accepted by the transaction processor 212 and the new bid is stored in the auction bid data storage 218 and identified as the current high bid.

As the auction deadline approaches, there is often a flurry of bid activity. At the end of the auction deadline, the transaction processor 212 will no longer accept further bids and the last high bid may be designated as the winner of the auction. If that bid exceeds the auction reserve data price, the article will be sold to the high bidder upon completion of a financial transaction.

In a live or real-time auction, the transaction processor 212 will accept bids and will publicly display the current high bid. Other bidders may increase the bid value and thereby become the high bidder for a particular article. In this embodiment, an "auctioneer" must manually determine when the high bid value is reached and there are not further bids for a particular artifact. At that point, the transaction processor 212 may be configured to reject any further bids and to indicate the end of the auction. The article is then sold to the high bidder upon completion of the appropriate financial transaction.

Other known auction variations may also be implemented with the system 200. For example, artifacts may be bundled together and sold as a single item containing multiple different articles. For example, if the honoree is a musician, a series of concert tickets from different venues on a particular tour may be bundled together and offered for auction as a single item. Similarly, a concert ticket and poster promoting the concert may be bundled together and auctioned as a single article. Other variations of auction are considered within the scope of the present description.

Figure 21:
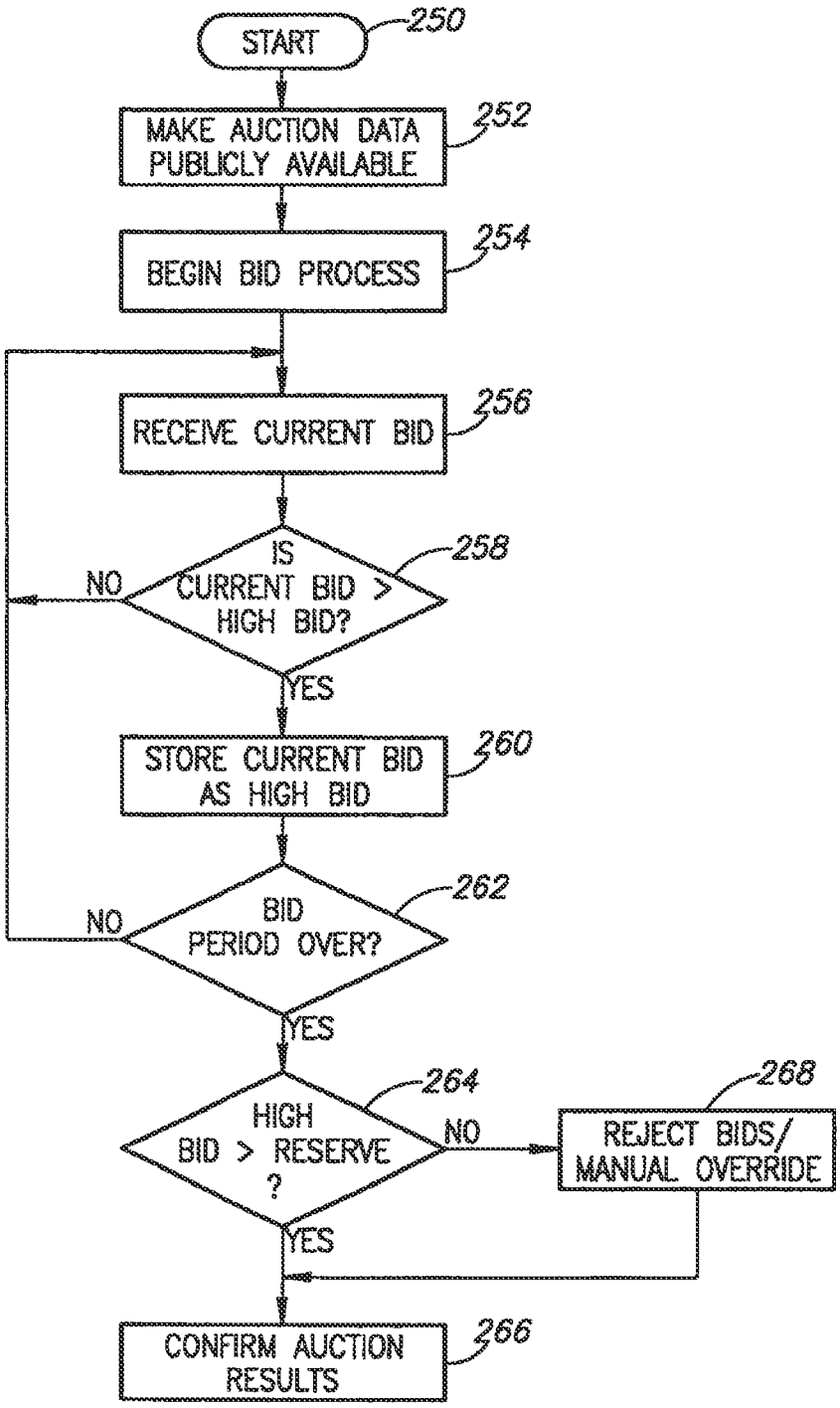
FIG. 21 is a flow chart illustrating the auction process implemented by the system of FIG. 20.

FIG. 21 is a flow chart illustrating an exemplary on-line auction. At a start 250, the cenotaph memorial facility 100 is already established and a system, such as the system 200, is configured to function as a server and thereby control the auction process. At step 252, the system 200 makes the auction data publicly available so that potential bidders can view data describing the articles available for auction. In step 254, the bidding process begins. As a prelude to bidding, the system 200 may require bidder registration. The registration process may require identification data for each bidder and may also require the bidder to provide financial information, such as a credit card, bank account information, or the like. The transaction processor 212 (see FIG. 20) may initiate a credit check to determine whether each bidder has the financial capacity to complete the transaction using, by way of example, an estimated bid price for the article or articles available for auction. The transaction processor 212 may store the bidder registration data in the data storage device 206.

When the bidding process begins at step 254, it is possible to set an opening bid price as a minimum starting point. The system 200 may display the opening minimum price and, alternatively, may also display the current high bid.

At step 256, the system 200 receives a current bid. In decision 258, the transaction processor determines whether the current bid is greater than the high bid. As those skilled in the art will appreciate, the first bid accepted by the system 200 will, in fact, be the high bid. If the current bid is not higher than the high bid, the result of decision 258 is NO and the system 200 returns to step 256 to receive additional current bids. The system 200 may also transmit an optional bid rejection message to the bidder if the result of decision 258 was NO.

If the current bid is greater than the high bid, the result of decision 258 is YES. In that event, the transaction processor 212 stores the current bid as the new high bid stored in the auction bid data storage 218 (see FIG. 20). In addition, the transaction processor 212 stores the bid in association with the bidder identification so that the system 200 knows the identity of the current high bidder. As previously discussed, the transaction processor 212 may store only the current high bid in association with the bidder identification data. Alternatively, the transaction processor may store the entire bidding history or simply a selected portion of the bidding history, such as the last ten bids. The bid history may also be stored in association with bidder identification. This data may be useful if the final high bidder does not complete the financial transaction as required by the auction. In such an event, it is possible that the second place bidder will be declared the winner if they complete the financial transaction within a specified time period.

In decision 262, the system 200 determines whether the bid period has ended. The auction deadline data storage 220 contains this information. This process is used if the auction is a timed auction, such as may occur over a period of hours or days. If the auction process is a live auction, there is no automatic determination of the end of the bid period. If the bid period has not yet arrived, the result of decision 262 is NO and the process returns to step 256 to receive additional bids. If the bid period has terminated, the result of decision 262 is YES. In that event, the system 200 moves to decision 264 to determine whether the high bid has exceeded the reserve price using the data stored in the auction reserve price data storage 216 (see FIG. 20). If the high bid did exceed the reserve price, the result of decision 264 is YES and, in step 266, the transaction processor 212 confirms the auction results. The confirmation of auction results leads to a financial transaction between the winning bidder and the cenotaph manorial facility 100. As previously discussed, the transaction processor 212 has stored bidder registration information, which may be used to complete the transaction. Alternatively, the winning bidder may be permitted a certain period of time in which to submit payment via certified check, cashier's check, or the like.

If the high bid did not exceed the reserve price, the result of decision 264 is NO. In that event, the system 200 may send out a notification rejecting just the winning bid or send a notification to each bidder to thereby reject all bids and the auction terminates without the article having been sold. Alternatively, the cenotaph memorial facility 100 may manually override the rejection of the auction reserve price and accept the bid as shown in the optional step with the confirmation of auction results is confirmed in step 266. For example, the auction reserve price data storage 216 may have a reserve price of $100.00 as a reserve price. If the winning bid was $97.00, the operator of the auction at the cenotaph memorial facility 100 may manually override the data in the auction reserve price data storage 216 and accept the bid of $97.00 as the winning bid. Thus, the process proceeds to step 266 to confirm the auction results and the winning bid of $97.00 in this example.

Those skilled in the art will appreciate that the flow chart of FIG. 21 is merely one example and that variations are within the scope of the present disclosure. For example, decision 262, which tests for the end of the bidding period, could be performed prior to receiving the current bid in step 256. Similarly, decision 264, which tests to determine whether the high bid is greater than the reserve price, could be modified to test whether the current bid exceeds the reserve price. This modified decision could occur either before or alter decision 258 is performed. Thus, those skilled in the art will appreciate that a number of variations may be performed in the on-line auction process using the teachings disclosed herein.

Figure 22:
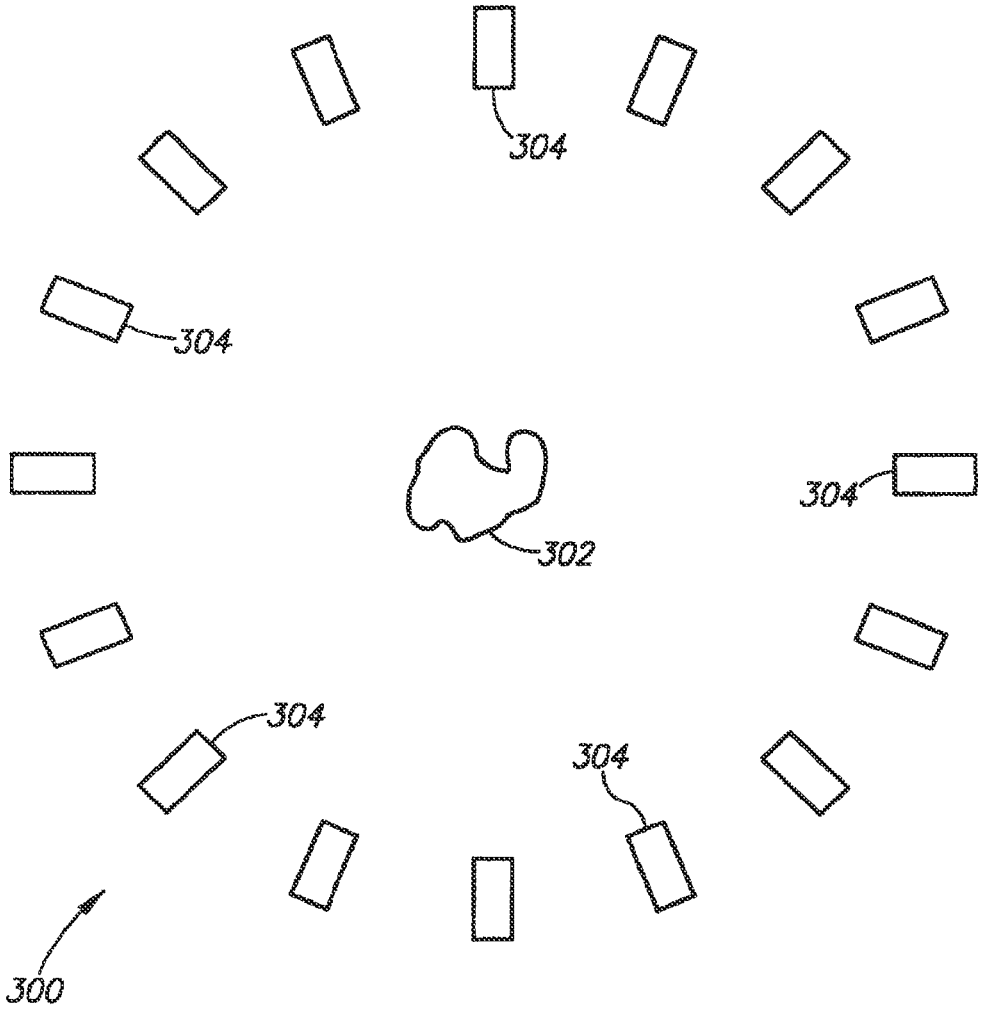
FIG. 22 is a functional block diagram of an image capture system.

The remote display of archival items has already been discussed above. In yet another aspect, the cenotaph memorial facility 100 can incorporate new display technologies, such as virtual reality (VR), 3-D remote display of archival items, holographic display, and the like. FIG. 22 illustrates one example of a virtual reality image capture system 300. In FIG. 22, an object 302 is illustrated as an abstract shape. However, those skilled in the art will appreciate that the object 302 is illustrative of any archival object that may be available for display in the cenotaph memorial facility 100. This could include, by way of example, medals, statues, awards, clothing, or the like. In addition, the VR image capture system 300 may be used to capture three dimensional imagery of a live person. The object 302 is intended to represent all such subjects. The object 302 is surrounded by a large number of video cameras 304. All video cameras 304 operate simultaneously to capture the object 302 from many different directions simultaneously. These various video images can be combined to create a three dimensional or VR representation of the object.

The computer system 168 in FIG. 19 controls remote viewing within the cenotaph memorial facility 100. In this embodiment, the video controller 180 may process the video signals from the various video cameras 304.

Alternatively, a specialized video processor (not shown) may be part of the computer system 168 to process the signals from the video camera 304 and create the VR image.

Alternatively, the VR image capture system 300 may include coherent light sources (e.g., laser light) to generate holographic images. The video controller 180 (see FIG. 19) can control the generation of holographic images and the remote distribution thereof. Alternatively, the computer system 168 in FIG. 19 may include additional specialized components for processing and generating holographic images.

Figure 23:
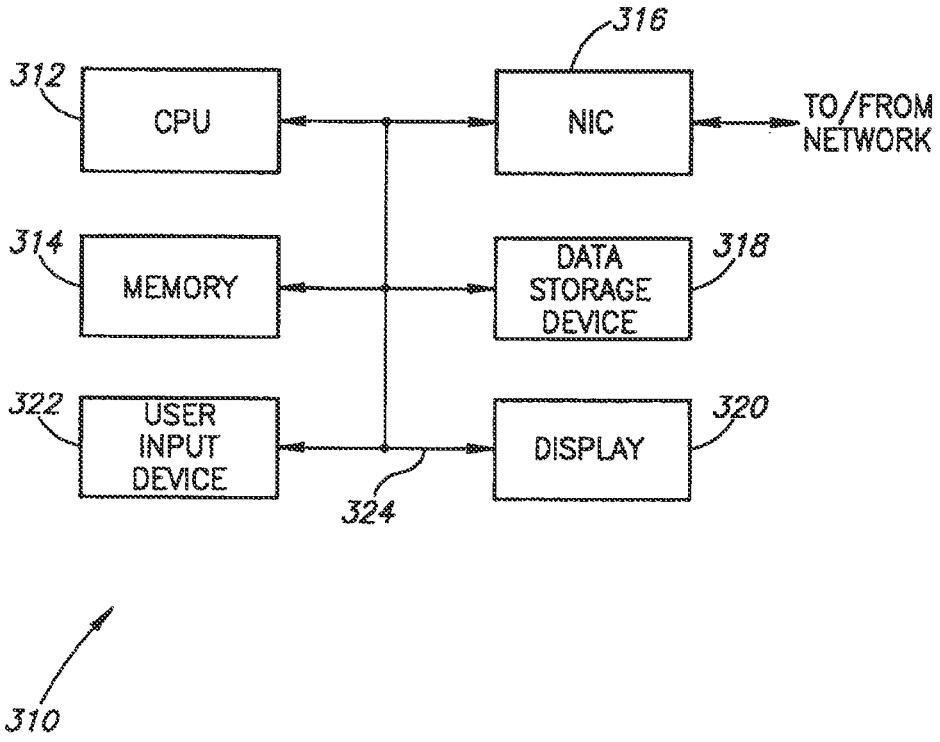
FIG. 23 is a functional block diagram of a virtual reality display system.

An exemplary VR image capture system 300 is illustrated in FIG. 22. The VR images may be transmitted to a remote location using the network interface controller 176 (see FIG. 19). FIG. 23 is a block diagram illustrating a VR display system 310. The VR display system 310 includes many conventional components, such as a CPU 312 and a memory 314. Time are conventional computer components whose general operation is known in the art and need not be described in greater detail herein.

Similarly, the VR display system 310 includes a network interface controller 316 to control communication between the VR display system and, by way of example, the VR image capture system 300. In a typical implementation, the communication link between the VR image capture system 300 and the VR display system 310 uses conventional components, such as routers, gateways, and a network infrastructure, such as the Internet.

The VR display system 310 includes a data storage device 318. The data storage device 318 may be implemented as one or more conventional data storage components. This may include, but is not limited to, a hard disk drive, optical drive (e.g., a DVD), a flash drive, or the like. In one embodiment, the data storage device 318 may be remote from the VR display system 310 and coupled to the VR display system using one or more network communication links. The VR display system 310 also includes a display 320 and a user input device 322. These components will be described in greater detail below. The various components described above are coupled together by a bus system 324. The bus system may include an address bus, a data bus, control bus, power bus, and the like. For the sake of simplicity, those various buses are illustrated in FIG. 23 as the bus system 324.

The VR display 320 may include a conventional flat panel display, such as a computer monitor. However, the display 320 may be implemented using a variety of different known technologies alone or in combination. As described above, the display 320 may be a simple computer display. Alternatively, it is known to use multiple projectors to project a holographic image of the object 302 within a three dimensional display area. That is, the object is displayed in a three dimensional space as a projected image. Other known technologies, such as a "heads-up" display may also be used. Special display glasses may provide stereoscopic displays and may include additional sensory information, such as sound through speakers or head phones. Using other known technologies, it is possible to project an image from a special pair of glasses directly onto the retina. Any of these known technologies may be used to implement the display 320. The display 320 is not limited by the specific form of display technology.

In certain aspects, the user may control the rotation of the object 302 from a remote location to thereby create a user-controllable VR display of the object 302. The user can zoom in or zoom out to thereby effectively enlarge or shrink the object 203. Other conventional operational controls are also available. In addition, the video image displayed on the flat display may be stored on the data storage device 318.

Remote control of the VR display is accomplished with the user input device 322. The user input device 322 may be implemented by conventional technology, such as a keyboard, mouse, joy stick, track ball, or the like. Alternatively, remote control of the display of the object 302 may be accomplished through multi-model devices, such as a wired glove worn by the user. Such wired gloves are known in the art, and need not be described in greater detail herein. The user's hand activates various sensors within the glove or gloves as the hand is moved. The output signals generated by the plurality of sensors in the glove are used to perform manipulations of the object 302 such as rotation, zoom in/out, and the like. Various other tracking technologies, such as mechanical, optical, ultrasonic, gyroscopic, may also be used to remotely control display of the object 302. The VR display system 310 is not limited by the particular input device 322 used to manipulate the object 302.

Thus, the cenotaph memorial facility 100 can display artifacts related to the honoree and facilitate an on-line auction system for such related articles. In addition, a variety of technologies may be integrated into the Cenotaph memorial facility 100 to permit special effects viewing, such as virtual reality, holographic or other three-dimensional remote display of archival objects.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A cenotaph facility comprising:

a building having [a roof member and a structural support member to provide structural support for the roof member such that the structural support member and the roof member define] an interior portion of the building;

a plurality of crypts housed within the interior portion of the building;

an object related to an honoree of the cenotaph facility and positioned within the interior portion of the building and memorializing the building in honor of the honoree;

a data storage device configured to store data related to the honoree;

a network interface controller (NIC) communicatively coupled to a computer network;

a server configured to retrieve a portion of the stored data related to the honoree in response to a request for data received from the computer network via the NIC and to transmit the portion of the stored data to the computer network via the NIC; and an on-line auction system comprising:

an auction data storage element configured to store auction data related to auction items related to the honoree, the auction data storage element communicatively coupled to an auction NIC to provide the auction data to a remote location via the computer network; and a transaction processor configured to control an auction of the auction items by receiving a bid for a particular auction item and analyzing the received bid to determine whether the received bid is a high bid exceeding other bids for the particular auction item, the transaction processor further configured to determine a winning bid from received bids.

2. The cenotaph facility of claim 1, further comprising an auction bid data storage element configured to store the received bid and a high bid value, wherein the analyzing by the transaction processor comprising comparing the received bid with the stored high bid value and, if the received bid is greater than the stored high bid value, storing the received bid as the high bid value.

3. The cenotaph facility of claim 1, further comprising an auction reserve price data storage element configured to store a minimum acceptable price for the particular auction item, the transaction processor further configured to determine that there is no winning bid from received bids if none of the received bids is greater than the minimum acceptable price.

4. The cenotaph facility of claim 1, further comprising a live auction conducted in conjunction with the on-line auction, cenotaph facility further comprising a communication device configured to communicate with participants in the live auction and to accept bids from the participants, the bids received from the participants being analyzed with respect to the high bid to determine if a bid received from one of the participants is the winning bid.

5. The cenotaph facility of claim 1, wherein the auction data related to the auction items is generated by a curator upon examination of the auction items.

6. The cenotaph facility of claim 1, further comprising:

a plurality of video cameras aimed at the interior portion of the building and configured to provide video source images; and the NIC being communicatively coupled to the plurality of video cameras to receive the video source images therefrom, the NIC being further configured to provide the video source images to a remote location via the computer network.

7. The cenotaph facility of claim 6 wherein at least one of the plurality of video cameras is remotely controllable, the cenotaph facility further comprising:

a video controller to control the remotely controllable video camera, wherein the NIC is further configured to receive a video control signal from a remote source via the computer network, and to communicate with the video controller, the video controller being responsive to the received video control signal to control the remotely controllable video camera.

8. The cenotaph facility of claim 1, further comprising:

an image capture system having a plurality of imaging devices directed to an artifact and configured to provide source images of the artifact;

an image processor configured to receive and process the source images of the object to thereby generate data representative of a three dimensional representation of the artifact; and the NIC being communicatively coupled to the image processor to receive the processed images therefrom, the NIC being further configured to provide the processed images to a remote location via the computer network.

9. The cenotaph facility of claim 8 wherein the plurality of imaging devices are holographic imaging devices and the processed images are holographic images.

10. The cenotaph facility of claim 8 wherein the image processor is configured to process the source images of the artifact to generate processed data for projection at the remote location, the NIC being further configured to provide the processed data for projection to the remote location via the computer network.

11. The cenotaph facility of claim 1 wherein the data storage device is in a location remote from the building.

12. The cenotaph facility of claim 1 wherein the server is in a location remote from the building.

13. The cenotaph facility of claim 1 wherein the stored data related to the honoree comprises biographic data, historical data, soundtracks, video clips, or other multimedia data.

14. The cenotaph facility of claim 1 wherein the server supports a website related to the honoree.

15. The cenotaph facility of claim 14 wherein the website has a public portion remotely accessible without restriction and a private portion remotely accessible only when authorized.

16. The cenotaph facility of claim 1 wherein the stored data is related to individuals interred in a portion of the plurality of crypts.

17. The cenotaph facility of claim 1 wherein [in] a portion of the plurality of crypts contain artifacts related to individuals interred in the respective ones of the portion of the plurality of crypts and the stored data is related to artifacts.

18. The cenotaph facility of claim 1 wherein the building has an external configuration based on the identity of the honoree.

19. The cenotaph facility of claim 1 wherein the object memorializing the building is a statue of the honoree.

20. The cenotaph facility of claim 1 wherein the honoree is an individual.

21. The cenotaph facility of claim 1 wherein the honoree is a group of individuals.

22. The cenotaph facility of claim 1 wherein the honoree is a group of individuals associated with a historical event.

23. A cenotaph facility comprising:

a building *memorializing an honoree*;

a plurality of crypts housed within the building; [an object related to an honoree of the cenotaph facility and memorializing the building in honor of the honoree;] and an on-line auction system comprising:

an auction data storage element configured to store auction data related to auction items related to the honoree, the auction data storage element communicatively coupled to an auction NIC to provide the auction data to a remote location via [the] *a* computer network; and a transaction processor configured to control an auction of the auction items by receiving a bid for a particular auction item and analyzing the received bid to determine whether the received bid is a high bid exceeding other bids for the particular auction item, the transaction processor further configured to determine a winning bid from received bids.

24. The cenotaph facility of claim 23, further comprising:

a plurality of imaging devices aimed at the interior portion of the building and configured to provide source images; and a network interface controller (NIC) communicatively coupled to the plurality of imaging devices to receive the source images therefrom, the NIC being further configured to provide the source images to a remote location via the computer network.

25. The cenotaph facility of claim 24 wherein at least one of the plurality of imaging devices is remotely controllable, the cenotaph facility further comprising:

an imaging device controller to control the remotely controllable imaging device, wherein the NIC is further configured to receive a control signal from a remote source via the computer network, and to communicate with the imaging device controller, the imaging device controller being responsive to the received control signal to control the remotely controllable imaging device.

26. The cenotaph facility of claim 23, further comprising:

an image capture system having a plurality of imaging devices directed to an artifact and configured to provide source images of the artifact;

an image processor configured to receive and process the source images of the artifact to thereby generate data representative of a three dimensional representation of the artifact; and a network interface controller (NIC) communicatively coupled to the image processor to receive the processed images therefrom, the NIC being further configured to provide the processed images to a remote location via the computer network.

27. The cenotaph facility of claim 26 wherein the plurality of imaging devices are holographic imaging devices and the processed images are holographic images.

28. The cenotaph facility of claim 26 wherein the image processor is configured to process the source images of the artifact to generate processed data for projection at the remote location, the NIC being further configured to provide the processed data for projection to the remote location via the computer network.

29. The cenotaph facility of claim 23 wherein a first portion of the plurality of crypts have a first size and a second portion of the plurality of crypts have a second size different from the first size.

30. The cenotaph facility of claim 23 wherein the building has an interior portion with first and second levels wherein a first portion of the plurality of crypts are positioned on the first level and a second portion of the plurality of crypts are positioned on the second level.

31. The cenotaph facility of claim 23 wherein the building has an exterior wall having an exterior portion and an interior portion with a portion of the plurality of crypts being positioned on the interior portion of the exterior wall.

32. The cenotaph facility of claim 23 wherein the building has an exterior wall and an interior wall with a portion of the plurality of crypts being positioned on the interior wall.

33. The cenotaph facility of claim 23 wherein the building comprises a plurality of interior columns with a portion of the plurality of crypts being positioned on the interior columns.

34. The cenotaph facility of claim 23 wherein a portion of the plurality of crypts has a visually transparent front member to permit viewing of objects placed within the crypt.

35. A method of operating a cenotaph facility *dedicated to an honoree* comprising:

installing a plurality of crypts within [an interior portion of] a building [having a roof member and a structural support member to provide structural support for the roof member such that the structural support member and the roof member define the interior portion of the building];

[installing an object related to an honoree of the cenotaph facility within the interior portion of the building and memorializing the building in honor of the honoree;]

using a data storage device to store data related to the honoree;

receiving a request for data from a computer network for a portion of the stored data related to the honoree from a remote computer;

retrieving, by a server, the requested portion of the stored data; and transmitting the requested portion of the stored data to the remote computer using the computer network;

storing auction data related to auction items for an on-line auction, the auction items relating to the honoree;

providing the auction data to a remote location via the computer network;

receiving a bid for a particular auction item;

analyzing the received bid to determine whether the received bid is a high bid exceeding other bids for the particular auction item; and determining a winning bid from received bids.

36. The method of claim 35, further comprising:

conducting a live auction in conjunction with the on-line auction; communicating with participants in the live auction to accept bids from the participants; and analyzing bids received from the participants with respect to the high bid to determine if a bid received from one of the participants is the winning bid.

37. The method of claim 35, further comprising;

conducting an examination of the auction items by a curator; and generating the auction data related to the auction items based on the curator examination of the auction items.

38. The method of claim 35, further comprising:

aiming a plurality of imaging devices at the interior portion of the building to generate source images; and providing the source images to the remote location via the computer network.

39. The method of claim 38 wherein at least one of the plurality of imaging devices is remotely controllable, the method further comprising:

receiving a control signal from a remote source via the computer network; and controlling the remotely controllable imaging device in response to the received control signal.

40. The method of claim 35, further comprising:

using an image capture system having a plurality of imaging devices directed to an artifact to provide source images of the artifact;

an image processor configured to receive and process the source images of the artifact to thereby generate data representative of a three dimensional representation of the artifact; and

[the] *an* NIC being communicatively coupled to the image processor to receive the processed images therefrom, the NIC being further configured to provide the processed images to a remote location via the computer network.

41. The method of claim 40 wherein the plurality of imaging devices are holographic imaging devices and the processed images are holographic images.

42. The method of claim 40 wherein the source images of the artifact are processed to generate processed data for projection at the remote location.

*43. A cenotaph facility comprising:*

*a structure memorialized in honor of an honoree;*

*a plurality of crypts housed within the structure; and*

*an on-line auction system comprising:*

*an network interface controller to couple the auction system to a computer network;*

*an auction data storage element configured to store auction data related to auction items related to the honoree, the auction data storage element configured to provide the auction data to a remote location via the computer network; and*

*a transaction processor configured to control an auction of the auction items by receiving a bid for a particular auction item and analyzing the received bid to determine whether the received bid is a high bid exceeding other bids for the particular auction item, the transaction processor further configured to determine a winning bid from received bids.*

* * * * *